(12) United States Patent
Koplar

(10) Patent No.: US 9,609,278 B2
(45) Date of Patent: Mar. 28, 2017

(54) METHOD AND SYSTEM FOR AUXILIARY DATA DETECTION AND DELIVERY

(71) Applicant: Koplar Interactive Systems International, LLC, St. Louis, MO (US)

(72) Inventor: Edward J. Koplar, St. Louis, MO (US)

(*) Notice: Subject to any disclaimer, the term of this patent is extended or adjusted under 35 U.S.C. 154(b) by 0 days.

(21) Appl. No.: 14/797,511

(22) Filed: Jul. 13, 2015

(65) Prior Publication Data

US 2015/0319507 A1    Nov. 5, 2015

Related U.S. Application Data

(63) Continuation-in-part of application No. 14/444,493, filed on Jul. 28, 2014, now Pat. No. 9,113,189, which is a continuation of application No. 13/770,394, filed on Feb. 19, 2013, now Pat. No. 8,850,468, which is a continuation of application No. 12/979,834, filed on
(Continued)

(51) Int. Cl.
| | |
|---|---|
| *H04N 21/41* | (2011.01) |
| *H04N 7/16* | (2011.01) |
| *H04N 7/08* | (2006.01) |
| *H04N 7/00* | (2011.01) |
| *H04N 7/173* | (2011.01) |
| *H04N 21/418* | (2011.01) |
| *H04N 21/435* | (2011.01) |
| *H04N 21/462* | (2011.01) |
| *H04N 21/4784* | (2011.01) |
| *H04N 21/81* | (2011.01) |
| *G06Q 30/02* | (2012.01) |

(52) U.S. Cl.
CPC .......... *H04N 7/163* (2013.01); *G06Q 30/0239* (2013.01); *H04N 7/002* (2013.01); *H04N 7/08* (2013.01); *H04N 7/17318* (2013.01); *H04N 7/17345* (2013.01); *H04N 21/418* (2013.01); *H04N 21/4126* (2013.01); *H04N 21/435* (2013.01); *H04N 21/4622* (2013.01); *H04N 21/4784* (2013.01); *H04N 21/812* (2013.01); *H04N 21/8126* (2013.01)

(58) Field of Classification Search
CPC .................................................. H04N 21/4126
See application file for complete search history.

(56) References Cited

U.S. PATENT DOCUMENTS

| | | |
|---|---|---|
| 5,057,845 A | 10/1991 | Gellekink |
| 5,122,873 A | 6/1992 | Golin |
| (Continued) | | |

*Primary Examiner* — Hunter B Lonsberry
(74) *Attorney, Agent, or Firm* — The Small Patent Law Group; Christopher R. Carroll

(57) ABSTRACT

A method and system for auxiliary data detection. Data is received on a hand-held device from a display of a signal on a monitor. The signal is visually displayed on the monitor at a frequency. A modulated video signal is received on the hand-held device from a display device. The modulated video signal contains auxiliary data modulated within a video signal in a substantially invisible way. The modulated video signal is demodulated to obtain the auxiliary data. At least one of the data or the auxiliary data is processed to identify a promotional opportunity available through the hand-held device. The user of the hand-held device is notified of availability of the promotional opportunity through the hand-held device.

18 Claims, 15 Drawing Sheets

Related U.S. Application Data

Dec. 28, 2010, now Pat. No. 8,453,171, which is a continuation of application No. 12/511,809, filed on Jul. 29, 2009, now Pat. No. 7,886,329, which is a continuation of application No. 11/686,156, filed on Mar. 14, 2007, now Pat. No. 7,590,992, which is a continuation of application No. 09/829,223, filed on Apr. 9, 2001, now Pat. No. 7,213,254.

(60) Provisional application No. 60/195,542, filed on Apr. 7, 2000, provisional application No. 60/207,460, filed on May 25, 2000, provisional application No. 60/266,238, filed on Feb. 4, 2001.

(56) References Cited

U.S. PATENT DOCUMENTS

| | | |
|---|---|---|
| 6,122,610 A | 9/2000 | Isabelle |
| 6,145,081 A | 11/2000 | Winograd et al. |
| 6,175,627 B1 | 1/2001 | Petrovic et al. |
| 6,430,301 B1 | 8/2002 | Petrovic |
| 6,792,542 B1 | 9/2004 | Lee et al. |
| 6,834,308 B1 | 12/2004 | Ikezoye et al. |
| 6,888,943 B1 | 5/2005 | Lam et al. |
| 6,947,509 B1 | 9/2005 | Wong |
| 6,968,337 B2 | 11/2005 | Wold |
| 7,046,808 B1 | 5/2006 | Metois et al. |
| 7,363,278 B2 | 4/2008 | Schmelzer et al. |
| 7,460,667 B2 | 12/2008 | Lee et al. |
| 7,500,007 B2 | 3/2009 | Ikezoye et al. |
| 7,529,659 B2 | 5/2009 | Wold |
| 7,533,266 B2 | 5/2009 | Bruekers et al. |
| 7,562,012 B1 | 7/2009 | Wold et al. |
| 7,565,327 B2 | 7/2009 | Schmelzer |
| 7,639,599 B2 | 12/2009 | Van Der Veen et al. |
| 7,707,088 B2 | 4/2010 | Schmelzer |
| 7,711,652 B2 | 5/2010 | Schmelzer |
| 7,779,271 B2 | 8/2010 | Langelaar |
| 7,797,249 B2 | 9/2010 | Schmelzer et al. |
| 7,844,072 B2 | 11/2010 | Van Leest et al. |
| 7,877,438 B2 | 1/2011 | Schrempp et al. |
| 7,917,645 B2 | 3/2011 | Ikezoye et al. |
| 7,996,678 B2 | 8/2011 | Kalker et al. |
| 8,006,314 B2 | 8/2011 | Wold |
| 8,082,150 B2 | 12/2011 | Wold |
| 8,085,935 B2 | 12/2011 | Petrovic |
| 8,086,445 B2 | 12/2011 | Wold et al. |
| 8,112,818 B2 | 2/2012 | Wold |
| 8,130,746 B2 | 3/2012 | Schrempp |
| 8,180,098 B2 | 5/2012 | Kalker |
| 8,199,651 B1 | 6/2012 | Schrempp et al. |
| 8,259,938 B2 | 9/2012 | Petrovic et al. |
| 8,332,326 B2 | 12/2012 | Schrempp et al. |
| 8,452,971 B2 | 5/2013 | Kalker et al. |
| 8,467,445 B2 | 6/2013 | Celik et al. |
| 8,484,691 B2 | 7/2013 | Schmelzer |
| 8,538,066 B2 | 9/2013 | Petrovic et al. |
| 8,601,504 B2 | 12/2013 | Stone et al. |
| 8,615,104 B2 | 12/2013 | Petrovic et al. |
| 8,645,279 B2 | 2/2014 | Schmelzer |
| 8,682,026 B2 | 3/2014 | Petrovic et al. |
| 8,732,858 B2 | 5/2014 | Wold |
| 8,745,403 B2 | 6/2014 | Petrovic |
| 8,775,317 B2 | 7/2014 | Schmelzer |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 8,959,202 B2 | 2/2015 | Haitsma et al. |
| 8,972,481 B2 | 3/2015 | Schrempp et al. |
| 9,009,482 B2 | 4/2015 | Winograd |
| 9,049,468 B2 | 6/2015 | Ikezoye et al. |
| 9,081,778 B2 | 7/2015 | Garside et al. |
| 9,106,964 B2 | 8/2015 | Zhao et al. |
| 9,113,189 B2 * | 8/2015 | Koplar ............ G06K 19/07703 |
| 2002/0090114 A1 | 7/2002 | Rhoads |
| 2002/0168087 A1 | 11/2002 | Petrovic |
| 2003/0014634 A1 | 1/2003 | Petrovic |
| 2003/0018709 A1 | 1/2003 | Schrempp et al. |
| 2003/0033321 A1 | 2/2003 | Schrempp et al. |
| 2003/0037010 A1 | 2/2003 | Schmelzer |
| 2003/0046064 A1 | 3/2003 | Moriya |
| 2003/0135623 A1 | 7/2003 | Schrempp et al. |
| 2004/0073916 A1 | 4/2004 | Petrovic et al. |
| 2004/0163106 A1 | 8/2004 | Schrempp et al. |
| 2004/0169581 A1 | 9/2004 | Petrovic et al. |
| 2005/0044189 A1 | 2/2005 | Ikezoye et al. |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0196051 A1 | 9/2005 | Wong et al. |
| 2005/0227715 A1 | 10/2005 | Riedl |
| 2006/0034177 A1 | 2/2006 | Schrempp |
| 2006/0209209 A1 | 9/2006 | Reynolds |
| 2006/0239501 A1 | 10/2006 | Petrovic et al. |
| 2006/0239502 A1 | 10/2006 | Petrovic et al. |
| 2006/0239503 A1 | 10/2006 | Petrovic et al. |
| 2007/0039018 A1 | 2/2007 | Saslow et al. |
| 2007/0074147 A1 | 3/2007 | Wold |
| 2007/0110237 A1 | 5/2007 | Tehranchi et al. |
| 2008/0002854 A1 | 1/2008 | Tehranchi et al. |
| 2008/0037151 A1 | 2/2008 | Fujimoto |
| 2008/0141379 A1 | 6/2008 | Schmelzer |
| 2008/0154730 A1 | 6/2008 | Schmelzer et al. |
| 2008/0155116 A1 | 6/2008 | Schmelzer |
| 2008/0313713 A1 | 12/2008 | Cutler |
| 2009/0030651 A1 | 1/2009 | Wold |
| 2009/0031326 A1 | 1/2009 | Wold |
| 2010/0046606 A1 | 2/2010 | Celik et al. |
| 2011/0066723 A1 | 3/2011 | Haitsma et al. |
| 2011/0280436 A1 | 11/2011 | Kalker et al. |
| 2012/0017091 A1 | 1/2012 | Petrovic et al. |
| 2012/0072730 A1 | 3/2012 | Winograd et al. |
| 2012/0072731 A1 | 3/2012 | Winograd et al. |
| 2012/0124679 A1 | 5/2012 | Wold |
| 2013/0011008 A1 | 1/2013 | Ikezoye et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0276138 A1 | 10/2013 | Schmelzer |
| 2013/0279741 A1 | 10/2013 | Celik et al. |
| 2014/0032555 A1 | 1/2014 | Kiff et al. |
| 2014/0059591 A1 | 2/2014 | Terpstra et al. |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao et al. |
| 2014/0089307 A1 | 3/2014 | Garside et al. |
| 2014/0115716 A1 | 4/2014 | Schmelzer |
| 2014/0196071 A1 | 7/2014 | Terpstra et al. |
| 2014/0215643 A1 | 7/2014 | Wold |
| 2014/0267907 A1 | 9/2014 | Downes et al. |
| 2014/0270337 A1 | 9/2014 | Zhao et al. |
| 2014/0270340 A1 | 9/2014 | Maas et al. |
| 2014/0279296 A1 | 9/2014 | Petrovic et al. |
| 2014/0325673 A1 | 10/2014 | Petrovic et al. |
| 2014/0376723 A1 | 12/2014 | Petrovic et al. |
| 2015/0019653 A1 | 1/2015 | Terpstra |
| 2015/0030200 A1 | 1/2015 | Petrovic et al. |
| 2015/0043768 A1 | 2/2015 | Breebaart |
| 2015/0121534 A1 | 4/2015 | Zhao et al. |
| 2015/0154273 A1 | 6/2015 | Schrempp et al. |
| 2015/0234814 A1 | 8/2015 | Ikezoye et al. |

\* cited by examiner

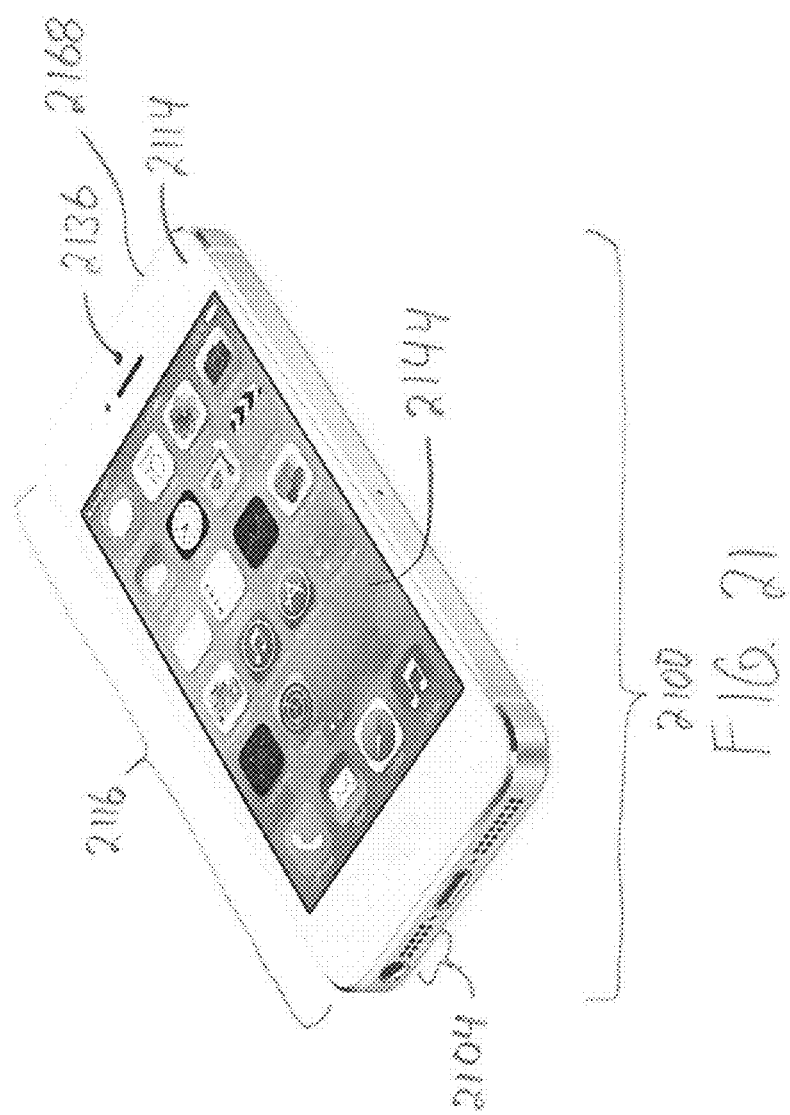

METHOD AND SYSTEM FOR AUXILIARY DATA DETECTION AND DELIVERY

CROSS-REFERENCE TO RELATED APPLICATIONS

This application is a continuation-in-part of U.S. application Ser. No. 14/444,493, filed on 28 Jul. 2014 (the "'493 application"), which is a continuation of U.S. application Ser. No. 13/770,394 (now U.S. Pat. No. 8,850,468), filed on 19 Feb. 2013 (the "'394 application"), which is a continuation of U.S. application Ser. No. 12/979,834 (now U.S. Pat. No. 8,453,171), filed on 28 Dec. 2010 (the "'834 application"), which is a continuation of U.S. application Ser. No. 12/511,809 (now U.S. Pat. No. 7,886,329), filed on 29 Jul. 2009 (the "'329 patent"), which is a continuation of U.S. application Ser. No. 11/686,156 (now U.S. Pat. No. 7,590,992), filed on 14 Mar. 2007 (the "'992 patent"), which is a continuation of U.S. application Ser. No. 09/829,223 (now U.S. Pat. No. 7,213,254), filed on 9 Apr. 2001 (the "'254 patent"), which claims priority to U.S. Provisional Application Ser. No. 60/195,542, filed 7 Apr. 2000 (the "'542 application"), U.S. Provisional Application Ser. No. 60/207,460, filed 25 May 2000 (the "'460 application"), and U.S. Provisional Application Ser. No. 60/266,238, filed 4 Feb. 2001 (the "'238 application"). The entire disclosures of the above patents and patent applications (e.g., the '493 application, the '394 application, the '834 application, the '329 patent, the '992 patent, the '254 patent, the '542 application, the '460 application, and the '238 application) are incorporated by reference.

BACKGROUND

The present invention relates to interactive hand-held devices, and more particularly to methods and apparatuses for receiving and decoding modulated signals for use by hand-held devices, and receiving benefits from receptions of the signals.

The hand-held device of the present invention receives modulated signals for purposes including enjoyment, promotion, transfer of information, data collection, commercial verification, security, education, and transactions or verifications at points of sale, as well as other commercial, personal, entertainment, or amusement purposes collectively referred to herein as "promotional opportunities." Data is preferably sent to the hand-held device by optical, audio, and/or electrical techniques, although the device can be independent of a specific transmission protocol and therefore may alternatively be sent via other methods. Data may be received by the hand-held device by utilizing a sleeve, cradle, or docking station; through an optical lens, by use of a PCMCIA or alternate computer port, by use of an audio pickup device (such as a microphone), or by FM, AM, and/or other radio frequency techniques, or other techniques as may be required based on the type of transmission means selected. Use of the device may allow users to receive, process, and/or store promotional opportunities.

U.S. Pat. No. 4,807,031 to Broughton et al. ("Broughton"), titled "Interactive Video Method and Apparatus," generally relates to in-band video broadcasting of commands and other encoded information to interactive devices. The invention described therein relates generally to interactive educational and entertainment systems, and is described in one embodiment in the context of television program control of toys located where there is a television receiver, as within a residence.

To encode control data capable of providing a benefit to a user, Broughton discloses a novel method of luminance or chrominance modulation of a video signal that creates a composite video signal, whereby control data is created by modulating the video signal. The novel modulation method alternately raises and lowers the luminance/chrominance of adjacent horizontal scan lines to create a video subcarrier that contains the control data.

Under Broughton, the video signal is not being replaced with other data, nor is the data being added as a separate signal along with the video signal, rather, the video signal itself is modulated to subsequently create the control data. Therefore, the control data is a part of, or contained within, the video signal. The encoding method also includes preview and remove circuitry to ensure suitability or the presence of data encoding and removal of data encoding, respectively.

The control data is transmitted either by television broadcast means, or by prerecorded video players that are connected to a video display. The control data is then received by the video display where a video field of the video display is modulated by control data. The control data is then detected with either opto-electronic or RF (radio frequency) detection means that discriminate the program material from the control data. The detected control data is further reproduced such that the control data can be used with an interactive device.

A practical example of a device as described above is the commercially-sold hand-held game device for receiving and detecting such control data called the "Wheel of Fortune" ITV Play-Along Game, intended to be used while viewing a television program presentation of the famous television show of the same name. The device, produced under license by the assignee of Broughton, was a palm-sized device that included a photosensor within its case to receive video signals. The device, upon receiving composite video signals, then discriminated the control data from the video program material and caused a liquid crystal display ("LCD") on the face panel of the toy to present portions of a word puzzle. Thereby users of the device may play the game along with a contestant, or play in response to a videotaped presentation of the game. The "Wheel of Fortune" interactive television (ITV) game together with its hand-held control device including keyboard was commercially available in 1988.

An improvement on the method of modulation described in Broughton is described in U.S. Pat. No. 6,094,228 to Ciardullo et al. ("Ciardullo"). In Ciardullo, improved methods of modulation are disclosed. Control data is inserted on the visual portion of a video signal by changing the luminance of paired lines in opposite directions, thus allowing larger amounts of data to be modulated in a signal. Broughton and Ciardullo are both incorporated herein by reference.

Efforts by others to provide hand-held devices capable of receiving transmission of modulated data from a video display are represented by U.S. Pat. Nos. 5,594,493; 5,761,601; 5,767,896; 5,907,350; and 5,953,047. Of these, U.S. Pat. No. 5,907,350 discloses a method for storing data on a so-called smart card, which is contended to receive, decode and store encoded data signals comprising redeemable coupons said to be embedded within television segments and transmitted along with normal television segments. The device of U.S. Pat. No. 5,907,350 is a hand-held unit that receives luminance signals from the television display in accordance with the principles of Broughton. The received video signals are decoded and stored within the card for future use. An LCD readout enables Universal Price Codes ("UPC") corresponding to the stored data. A scanner reads the UPC codes at a redemption site, and the stored coupon is then erased from a memory of the card. A microprocessor channels the decoding and storage aspects, and a keypad allows use and input.

The term "smart card" as used in the above patents, connotes a hand-held, portable device, not conceptually different from the above-mentioned "Wheel of Fortune" ITV game device. However, the term does not only apply to those patents.

As a generic term, "smart card" gradually has come to mean a card that looks like a credit card but includes a microchip or microprocessor embedded or incorporated into the card. The smart card may be referred to as a "fingerheld" computer, typically including a data storage media ranging from less than a kilobyte up to a megabyte (if not more), and are said to have originated in France. See, for example, Ognibene, P. J., "Card Smarts," Technology Decisions (July, 1999). Smart cards may, according to a line of reference, also be called "chip cards."

Prior efforts by the inventor of this patent application include United States Utility patent application entitled "Interactive Optical Cards and Other Hand-Held Devices with Increased Connectivity", U.S. Pat. No. 7,296,282, filed 21 Jan. 2000, by Edward J. Koplar and Daniel A. Ciardullo ("Koplar"), which is incorporated by reference herein. Koplar relates to various methods and apparatuses for use with promotional opportunities, such as interactive advertising and gaming. Koplar describes various methods for receiving and providing data to hand-held devices, as well as apparatuses for use with promotional opportunities and methods of using the same.

While the hand-held devices of the inventive subject matter described herein may be in the form of a smart card, they may also be in the form of other hand-held devices such as mobile phones. Recently, mobile phones have become equipped with increased capacity to store and process information, and many phones now offer limited network or Internet access. Industry experts estimate that by 2002, more than 100 million mobile phones will have Internet access in some fashion and that by 2003, more than 1 billion mobile phones will be in use worldwide. Mobile phones, with or without Internet access, may become powerful tools when appropriately configured to receive auxiliary data.

The personal digital assistants ("PDAs") are another form of hand-held device that may provide users with promotional opportunities under the present invention. The most popular manufacturer, Palm Computing, introduced its first PDA called the "Palm Pilot" in 1996. The latest version of the Palm Pilot, Palm VII, was introduced in 1999 and was the first PDA to include wireless Internet access without needing peripheral devices such as a modem.

PDAs and mobile phones, while capable of providing Internet access, as of the time of this invention have limited capabilities, including slow transfer rates of data. It is desirable to provide users of such hand-held devices and similar devices such as smart cards with hand-held devices that are compact in size yet rich in content that encourage users to participate in various promotional opportunities without having prolonged delays in receiving and processing information. Smart cards, mobile phones, PDAs, and similar hand-held devices are all capable of participating in the promotional opportunities described in this patent application.

BRIEF SUMMARY

For purposes of the inventive subject matter described herein, the terms "hand-held device" and "card" mean an interactive device of portable character, preferably of hand-held type which may be carried in the palm by a user, between fingers of the user, or is otherwise intended to be easily grasped and handled manually by the user, including credit card-like devices.

The term "sponsor" is used herein in its broadest possible sense, and may include without limitation entities that issue hand-held devices and entities that accept them or provide redemption services for users of the devices. Sponsors may also include health care and medical institutions and other service or eleemosynary organizations.

The term "computer" is used herein in its broadest possible sense, and may include without limitation a laptop or personal computer, mobile phone, personal digital assistant, or other computer-like device.

Among the several objects, features, and advantages of the inventive subject matter may be noted the provision of interactive hand-held devices for carrying out various modes of novel and commercially advantageous signaling, information-transferring, and value-indicating methods. The hand-held devices include portable devices such as smart cards, mobile phones, and personal digital assistants ("PDAs"), which contain hardware circuitry to receive auxiliary data by various possible transmission protocols. The hand-held devices, to provide some of the promotional opportunities described herein, preferably have circuitry to connect to the Internet, which may be referred to herein interchangeably as "network access", "wireless access", "Internet access" or "wireless Internet". These hand-held devices react from the reception of auxiliary data from sources including radio transmissions, computer systems, video recordings, video transmissions or other sources for reproduction of video, audio and/or other data. The hand-held devices, preferably utilize the transmission methods described in Broughton and Ciardullo pertaining to reception of auxiliary data from a video display via electrical and/or optical detection and decoding means. All video displays, whether a television set or monitor, television-like, or image-presenting display device capable of displaying an image containing a modulated video signal, may in the present specification be collectively referred to simply as "display devices." The hand-held devices may also respond to auxiliary data received from non-video displays, such as may be received directly from audio transmissions or a decoding box.

Signals are received, detected, and reproduced by the new hand-held devices for various promotional opportunities including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; or other commercial and non-commercial purposes.

Auxiliary data transmitted to the hand-held devices are encoded using a system of modulation, preferably as described in Broughton or Ciardullo, but alternatively by other known methods of modulation in the art including through the use of the vertical-blanking interval (VBI), audio subcarrier, electromagnetic subcarrier, and RF detection of video decoding. The video signals containing the auxiliary data may be transmitted to a display device by means of a broadcast, cable, standard digital video methods, satellite or home video.

Other objects, features, and/or advantages of the inventive subject matter include:

A method of interactive advertisement and promotion signal transmission using interactive hand-held devices in such a manner that both the mode of transmission of information and the display of received information and/or value indicative thereof will attract viewers' attention, stimulate viewers to pay attention to a transmission (which may be commercial advertising), and effectively entice viewers to respond and take action in response to its reception, as well as achieving the foregoing usage purposes;

A method of such signal transmission that is cost effective, brand efficient, and fun for users of the new interactive hand-held devices;

A method of such signal transmission using interactive hand-held devices which effectively increases customer awareness, retention, and differentiation of advertisers' messages and products;

A method of such signal transmission using video interactive hand-held devices which allows viewers of television (or video) presentations, including advertising, to directly interact with the devices (such as television receiver or display);

A method of such signal transmission using interactive hand-held devices that builds store (point-of-sale) traffic, fosters consumer loyalty, and gives viewers a reason to pay more attention to a company's products, services and advertising;

A method of such signal transmission using video interactive hand-held devices which allows viewers of television (or video) presentations, including advertising, to upload received information to a computer which displays and uses relevant Internet addresses, textual information or code, and other promotional information usable by a computer or computer-like device; and Hand-held devices which are intrinsically simple, effective and economical to make and distribute widely, and are reliable and easy to use.

The following are merely illustrative of some of the advantages and objects which the new system provides: television advertising response determination; interactive advertising and promotions; attraction of viewers' attention; effectively increase consumer awareness and retention of commercial advertising, messages, announcements, promotions, and specific products and services; increased customer differentiation of products and services; stimulation of viewers to watch commercials; increase of store traffic in response to commercial messages; fostering of consumer loyalty; enhancement of viewer involvement in program content, including commercials; enhancement of viewer retention of the content of commercial and other messages; enhancement of the value of commercial messages; increased product/service sales; saving of advertising costs; acceleration of response time of customers following delivery of commercial messages; verification of contests and awards; enhancement of viewer retention of the related website domain names; reduction of barriers related to e-commerce opportunities; additional and sometimes instant rewards and information obtainable via the Internet. The uses and advantages are more fully developed in the following description.

Briefly, herein is described a system which uses various hand-held devices to derive benefits from the reception of auxiliary data. Auxiliary data is encoded by modulation of a signal, such as video and/or audio, which thereby creates a composite video signal including auxiliary data and continuous video program data. The composite video signal is transmitted to and displayed by a display device so that it may be received and used by a hand-held device.

When the hand-held device is a smart card, the auxiliary data is received from composite video signals by optically detecting and extracting the auxiliary data directly onto the smart card. A user first positions the optical receiver of the smart card so that it is capable of receiving video signals from a display device. The smart card, when actuated and appropriately positioned, begins receiving video signals. Circuitry on the smart card discriminates whether auxiliary data is present in the video signals (i.e., where the video signals received are composite video signals). If auxiliary data is present, the hand-held device reproduces the auxiliary data for its use.

One method of receiving auxiliary data from composite video signals when the hand-held device is a mobile phone or PDA includes detecting and electronically extracting the auxiliary data from the video signal by use of a decoder box. The decoder box preferably receives a video signal from its source through the use of RCA jacks. The decoder box then processes the composite video signal to determine whether auxiliary data is present. The auxiliary data, when present, is transmitted from the decoder box to the hand-held device. Transmissions to the hand-held device can occur through RF or other audio techniques, so that the hand-held device need not be aimed at or physically connected to the decoder box. For example, the auxiliary data may be encoded within the audio of the composite signal and/or the composite signal may include audio that triggers (e.g., causes or otherwise directs) the hand-held device to obtain the auxiliary data (e.g., by downloading the auxiliary data via the Internet or another network). Although the optical transmission method is preferable for smart cards and the electrical transmission method is preferred for mobile phones and PDAs, both methods as well as other methods known in the art including through the use of vertical-blanking interval (VBI), audio subcarrier, electromagnetic subcarrier, and RF detection of video decoding, all of which are interchangeable and may be used with any of the hand-held devices of the present invention.

Among the several methods herein described may be noted a method of video interactive advertising and promotion, comprising normal television programming content modulated to contain auxiliary data, where the auxiliary data is associated with a sponsor and carries information of special significance relative to the sponsor and of special value to television viewers, distributing interactive devices of hand-held character to television viewers for their use and convenience, the devices being capable of selectively receiving auxiliary data or receiving and decoding composite video signals, providing incentives for viewers to use the interactive devices for obtaining the auxiliary data by rewarding the viewers with information of special value, the interactive devices being capable of retaining indication of having received the information, and providing redemption of the special value for users at a redemption site where users may present the interactive devices.

When auxiliary data is reproduced by use by the hand-held device, various signals, indications, display readouts, or other interactive events provide the user with a benefit according to content of the auxiliary data. The various interactive events described in Koplar, incorporated by reference herein, are usable interchangeably by and in conjunction with the hand-held devices and methods of using same with the present invention. The interchangeability includes selective use of the features of the present invention, along with selective use of any of the various apparatuses and methods of Koplar.

The designs of the hand-held devices are typically in the shape and form of smart cards, palm devices, or mobile phones. Additionally, other hand-manipulable devices of a similar size and nature that are capable of receiving and processing auxiliary data as described herein are also within the scope of the present invention and may receive data by electrical or optical methods as may be appropriate or desirable. Such hand-manipulable devices include stuffed animals or toys, snapshot-type cameras, replica sports helmets, scaled racing cars, or replica baseball bats.

Devices and methods are provided herein to allow an electronic coupon to be redeemed at a point of sale ("POS") using existing point of sale hardware and software. Additionally, coupons may be configured to be used only once and with a reasonably high degree of security. Furthermore, check out time is not seriously degraded and multiple coupons may be redeemed at the same POS with relative ease. One method of using a hand-held device at a POS involves the user giving the device to the cashier. The cashier then locates the correct coupon or redemption value on the hand-held device using a scrolling function in combination with the LCD. The hand-held device is then held such that the LCD is facing towards the cashier and a photodetector faces the bar code scanner. The "redeem" button is then pressed, and the photodetector on the hand-held device passes over the bar code scanner. The timer in the hand-held device resets the device to non-redeem mode if a scan is not detected within thirty seconds. When the scanning laser light is detected by the hand-held device, the device beeps and a numeric code is displayed which may correspond to a stock keeping unit (SKU) number or other information regarding receipt of product shipment, inventory, and/or stocking Other codes, including an additional numeric code such as the serial number of the hand-held device or a security code may also be displayed. The cashier then enters the numeric code or codes and the appropriate discount or value is applied to the purchase of the consumer. The timer may also delete the coupon if the hand-held device is scrolled to the next coupon, or if the device is powered down and then powered up again. The coupon may also be erased either automatically or manually by pressing predetermined buttons on the hand-held device.

The methods of data transmission as described in Broughton and Ciardullo are more complicated when data is being sent to hand-held devices via computer monitors, as opposed to other display devices such as televisions. Computers constantly refresh the screen displayed by the monitor. Therefore, modulating the video signal displayed by a monitor in real time is difficult and often impractical as a result of the constant refreshing of the video card and factors relating to the displaying of video by the computer. One or more embodiments of the inventive subject matter described herein transmit data from the monitor to the hand-held device in a less obtrusive manner.

Various other apparatuses and methods of the inventive subject matter described herein are set forth in the following description and claims. Similarly, other objects and features will be apparent or are pointed out more particular herein below.

BRIEF DESCRIPTION OF THE DRAWINGS

FIG. 21 illustrates another example of the inventive subject matter

Corresponding reference characters identify corresponding elements throughout the several views of the drawings.

DETAILED DESCRIPTION

Figure 1:
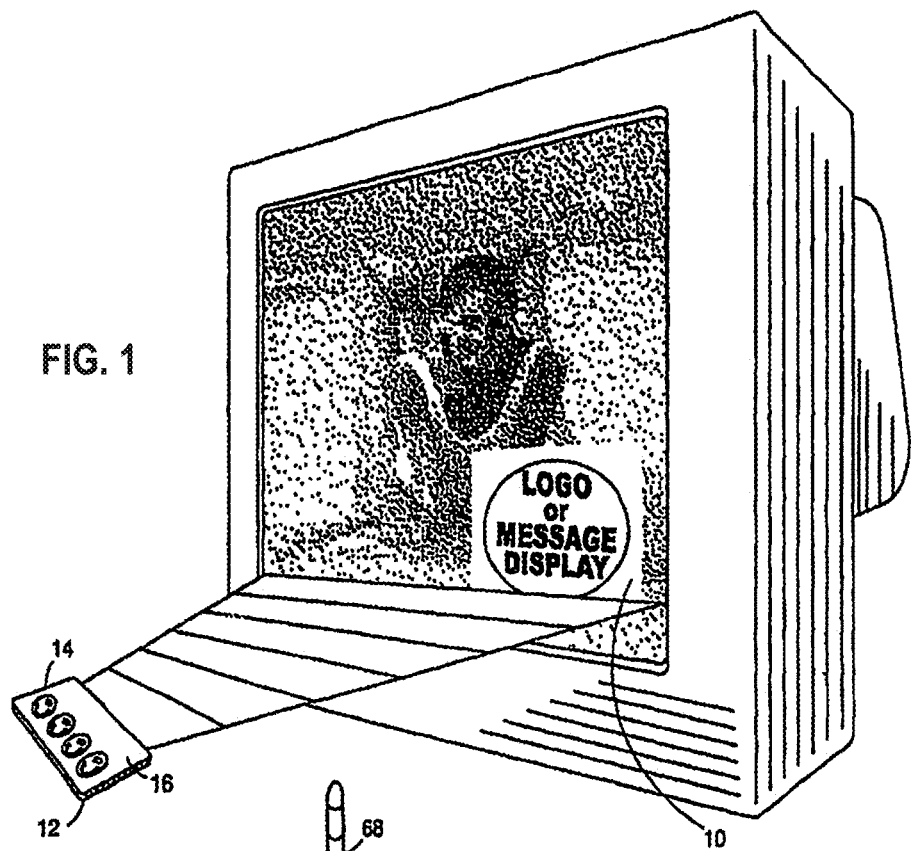
FIG. 1 is a perspective view schematically illustrating use of any of several embodiments of an interactive card in accordance with and embodying one example of the present invention.

Referring to FIG. 1, in a system of one example of the invention, and in accordance with the various methods herein described, composite video signals are received and projected by a display device 10, to be received by a first embodiment of an interactive hand-held device of the invention 12. The composite video signals may include a video signal and/or an audio signal. Display device 10 is representative of a television screen, video monitor or other video display, movie screen, computer monitor, video-converted display or video-like display, capable of receiving analog or digital video or video-representative signals from a suitable source, such as a television transmitter, a videotape, a streaming video server, a Digital Versatile Disc ("DVD"), or the computerized display representation of such a source of image content. For present purposes, it will be assumed that display device 10 is a kinescope or other conventional type of television display or monitor (which may, of course, include multiple or single-beam types of projector displays).

Display device 10 may schematically represent a video display for displaying video signals but may also be any sort of electron gun, active, array or passive array display device capable of providing not only imaged information in a visible mode but also auxiliary information (e.g., data) in a substantially transparent mode. Display device 10 may be further characterized as a computer monitor or display, as well as a portion or computer window of display device 10. Display device 10 may also be a high definition or digital television, or other digital video presentation device. Display device 10 may vary in size, and may be small like a Sony Watchman™, or large like a movie screen or a Sony Jumbotron™. Video signals receivable by display device 10 include those delivered by microwave relay, satellite retransmission or cable, streaming and other types of downloadable or viewable computer video presentations, and those generally made available by wired or wireless methods.

Hand-held device 12 may be in the form of any type of hand manipulable device such as a smart card, cell phone, PDA, or other palm like device. Enclosure 14 of hand-held device 12 is illustrated in FIG. 1 as taking the form of a smart card. Hand-held device 12 may be held in the palm or between the fingers of a user in the generally vicinity of display device 10, typically within the same room and, when necessary, oriented so that front surface 16 faces display device 10, and thereby hand-held device 12 may optically receive light from a visual representation of the video signal from display device 10. When hand-held device 12 is a smart card and configured to optically receive auxiliary data, it is typically is within the same room and suitably oriented so that device 10 may receive light from a visual representation of the video signal from the display device as shown in FIG. 1.

Figure 2:
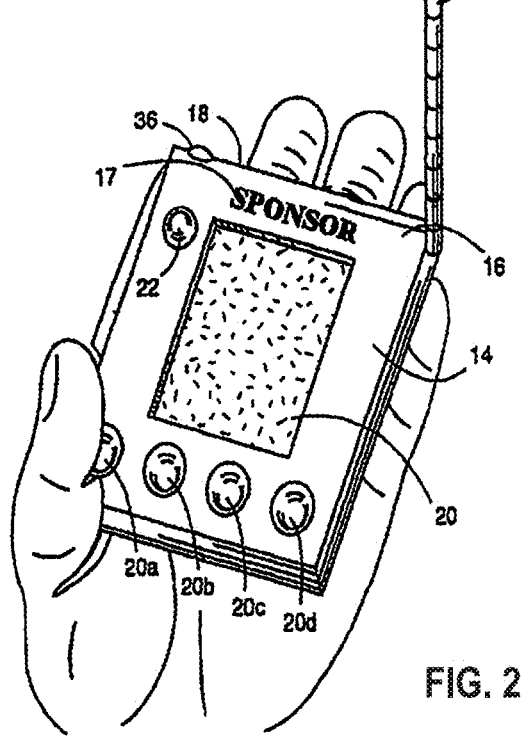
FIG. 2 is a perspective external view of an embodiment of an interactive card in accordance with and embodying one example of the present invention.

Hand-held device 12 is depicted in FIG. 2 as a PDA and shown in a manner in which it may be held and used. Hand-held device 12 may include a PDA-sized housing 14 that encloses various circuits and circuit components ("circuitry") of the device. Housing 14 may be of any hand-held shape desired that is functional and hand manipulable, examples of which include a PDA (as shown), cell phone, PCMCIA card, snapshot-type camera, replica sports helmet, replica baseball bat or football, or scaled racing car.

A brand name of a sponsor 17, and possibly information or indicia that may induce a user to associate device 12 with sponsor 17, may be imprinted on front surface 16 of hand-held device 12 above LCD 44. When hand-held devices 12 are inexpensive to manufacture, such as when they are in the form of smart cards, sponsors 17 may be found with higher frequency. However, when hand-held devices 12 are a user's personal device such as a cell phone or PDA that have primary uses other than receiving promotional opportunities, such indicia may not be less frequently included. Sponsor 17 may be a company providing the hand-held device 12 to a user of its service, such as a hotel, phone company, PDA service, or place of business, that uses device 12 for access, privileges, and/or rewards. Sponsors 17 may also include various entities such as advertisers, Internet websites, television shows, other occurrences, programs or events, for which use of hand-held device 12 will provide means for a user to obtain promotional opportunities.

Hand-held device 12 is illustrated in FIG. 2 to have both RF antennae 68 and lens 36 so that device 12 may receive auxiliary data by both optical and electrical (e.g., wireless) techniques. When hand-held device 12 contains such reception means, it may be used with various promotional opportunities in various locations. Thus, with one example of the present invention, a user may receive auxiliary data on hand-held device 12 at a game inside a stadium or arena electrically via RF antennae 68, and may also receive auxiliary data while watching a game at home optically by positioning front surface 18 towards display device 10 (as shown in FIG. 1). Users may thus participate in promotional in multiple locations using the same hand-held device 12. Optionally, the hand-held device 12 can audibly receive the auxiliary data encoded in audio of the composite signal and/or the hand-held device 12 can wirelessly receive the auxiliary data via the antennae 68 in response to receiving the audio signal (or a portion thereof).

Button 22 of hand-held device 12 can provide means for selecting between receiving auxiliary data via electrical means (such as through RF antenna 68) or by optical means (such as through lens 36). The user, based on their location, can select the means by which to receive the auxiliary data, thereby saving power and preventing user from receiving undesirable auxiliary data. However, hand-held device 12 may be configured to monitor the data input means to determine whether auxiliary data is being transmitted by any of the methods described herein.

Figure 3:
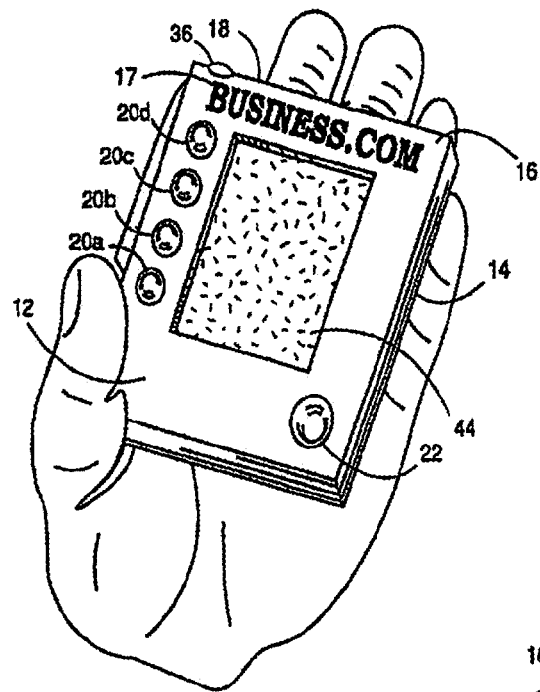
FIG. 3 is a perspective external view of an embodiment of an interactive card in accordance with and embodying one example of the present invention.

As shown in FIG. 3, a leading edge 18 of hand-held device 12 is outfitted with lens 36 to provide means for receiving auxiliary data. Visible from front surface 16 of hand-held device 12 is LCD 44 and four light-admitting diodes or other electro luminescent light sources 20a, 20b, 20c, and 20d. Depending on its desired promotional use, hand-held device 12 may include both LCD 44 and lights 20a, 20b, 20c, and 20d, one of the foregoing, or neither. Hand-held device 12 may have various users controls as described in Koplar, which may include a keypad or touch screen (not shown) to allow user input for specific functions and additional uses.

Figure 4:
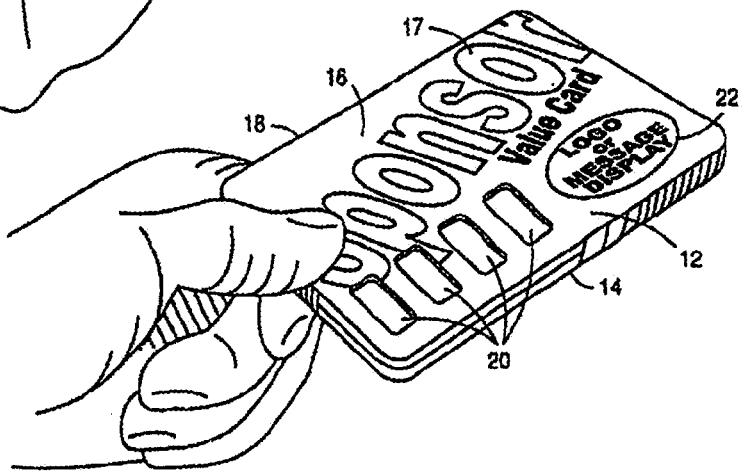
FIG. 4 is a perspective external view of an embodiment of an interactive card in accordance with and embodying one example of the present invention.

Hand-held device 12 is depicted as a smart card in FIG. 4 in a manner in which it may be held and used. Hand-held device 12 includes a credit card or wallet-card-sized housing 14 that encloses the circuitry of device 12.

A leading edge 18 of hand-held device 12 may include a lens or small aperture 36 to admit video signals to a photosensor 30 within housing 14, as is described herein. Visible from front surface 16 of hand-held device 12 are a plurality of light-emitting devices 20 which may be light-admitting diodes (LEDs) or other electro luminescent light sources, including, for example, regions of a LCD of either active or passive type.

A typical manner in which hand-held device 12 is used to optically receive auxiliary data is as follows: A user watches a television presentation such as a commercial, television program, movie, or other video-displayed program. When such a presentation is displayed, the user may then hold hand-held device 12 device as shown in FIG. 3 or 4, depending on the type of device 12 used. The user then positions hand-held device 12 so that leading edge 18 of device 12 will be positioned for receiving video signals from display device 10. Hand-held device 12 or display device 10 may have indicia informing the viewer to press the pressure membrane or button 22 at a preferred time, such as when a commercial of a sponsoring entity appears. Although the term "button" is used herein, it is considered to include membrane switches, pressure or touch regions capable of activation and carrying out the function of button 22. When the user presses button 22, the video signal will be detected and received by a photodetector (the process to be described below) within housing 14. The composite video signal comprises a video signal modulated with auxiliary data, in accordance with the teaching of the above-referenced Broughton and/or Ciardullo each of which are herein incorporated by reference. A discriminator, implemented by circuitry determines whether auxiliary data has been transmitted along with the video signal of the presentation.

Figure 13:
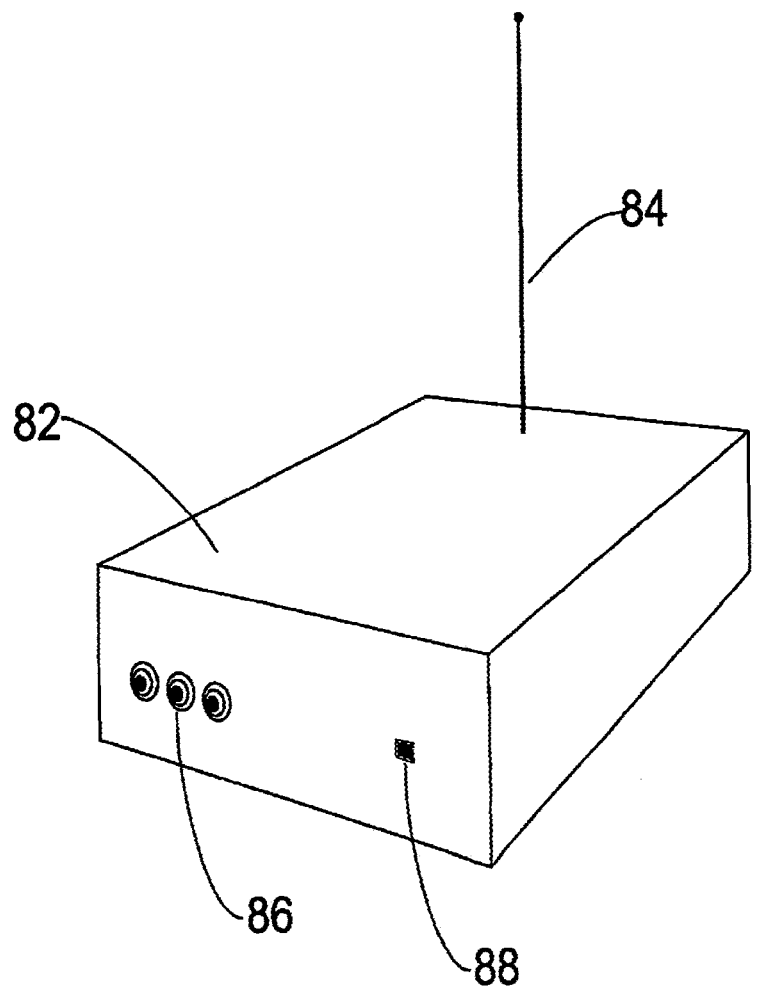
FIG. 13 is a perspective view of a decoding box.

A typical manner in which hand-held device 12 is used to electrically receive auxiliary data is as follows: video signals are sent to and received by a decoder box 82 as shown in FIG. 13. Decoder box 82 discriminates the auxiliary data and transfers it to hand-held device 12 by RF or by other means, such as IR, a computer port, or direct wire connection. Decoder box 82 may otherwise receive the data through other methods such as through use of a super VHS, fire wire, or coaxial jack, or may be connected to an RF antennae, integrated into the circuitry of a display device, or otherwise connected so that the decoder box receives the video stream. As may be observed in FIG. 13, decoder box 82 contains antenna 84 so that it may transmit RF signals between it and the hand-held device, RCA jacks 86, and a network interface jack 88 so that it may be connected with a computer network or directly to a computer.

An appropriately outfitted decoder box 84 may receive transmissions from other means including IR and direct connection through a computer interface such as a PCMCIA. Decoder box 84 may also function as a two-way device, so that it may receive feedback from the hand-held device. The decoder box may, with a graphics rendering unit such as a Scorpion processor, display information received from the hand-held device on the display device. The decoder box may contain network access, which may supplement or replace the need for network access on the hand-held device. The decoder box may also contain means to control peripheral devices, such as a VCR. Users, upon receipt of information such as a television schedule on their hand-held device, may transmit a request to the decoder box or VCR to schedule the recording of a television program.

Alternatively, the received video signals may be sent through an interface of hand-held device 12 to a computer or computer-like device where the discrimination of auxiliary data may be implemented in the computer's hardware or software. The computer interface apparatus and method of using same is described in Koplar.

Figure 7:
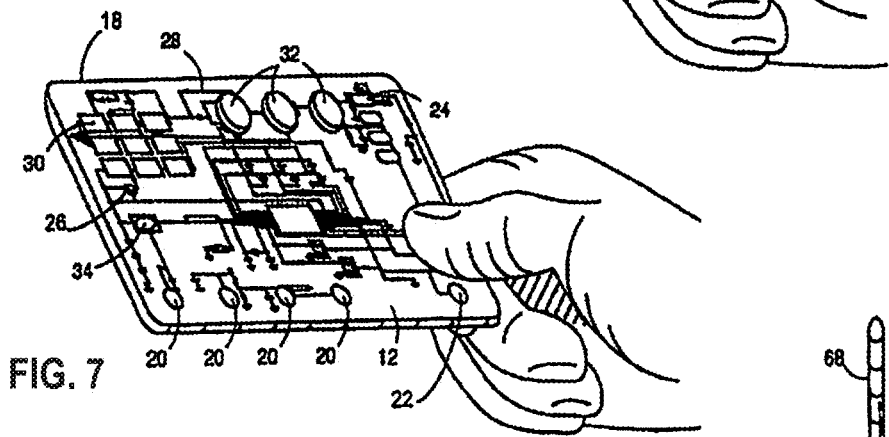
FIG. 7 is a perspective view of internal features of the interactive device of FIG. 6 of the embodiment of FIG. 6 showing an interactive card of one example of the invention.

If the discriminator determines that the transmitted video signals contain auxiliary data or auxiliary data is received, the circuitry of hand-held device 12 may then cause an audio transducer 34 (as shown in FIG. 7) present on the printed circuit board to sound a tone or "beep", providing assurance that the auxiliary data has been received satisfactorily. A suitable aperture may be provided on the front or rear surface of housing 14 to allow sound to pass from audio transducer 34.

Hand-held device 12 may contain more advanced means of providing sound to a user. Hand-held device 12 may contain advanced sound circuitry to enable device 12 to play digital audio, including popular audio formats MP3 and MIDI. The sound is preferably preset on the hand-held device 12. However, sound may also be downloaded to or prerecorded on hand-held device 12 and configured such that when an event occurs for which a sound is desired, the event triggers the circuitry of device 12, which causes a sound to be transmitted through audio transducer 34 or other hardware (not shown) designed to play sounds. Hand-held device 12 may also be configured to play sounds upon user demand, such as when user actuates button 22.

Hand-held device 12 may also be configured to initially prohibit user from taking advantage of prerecorded or preset sounds or promotional opportunities so that sounds or promotional opportunities are unavailable to the user. The hand-held device 12, upon receiving specific auxiliary data which directs device 12 to unlock the sounds and promotional opportunities so that the opportunities are available to the user. The sounds and promotional opportunities may then be available to the user for a limited time or indefinitely.

An additional feature may include the hand-held devices 12 coordinating their sounds. Once the sounds are available for use on hand-held device 12, users may perform the sounds as per the desired promotional event. Through use of the computer interface port as described in Koplar, or other communication means such as IR or RF, a hand-held device 12 may synchronize songs with other hand-held devices 12 and other peripheral devices by transferring and receiving information and triggers from the various devices.

The circuitry may also cause operation of one or more of lights 20a, 20b, 20c, and/or 20d of FIG. 2 or FIG. 3, to indicate a value that has been received. By outfitting hand-held device 12 with lights 20a, 20b, 20c, and/or 20d, device 12 is capable of providing promotional opportunities in the methods described in Koplar.

Figure 6:
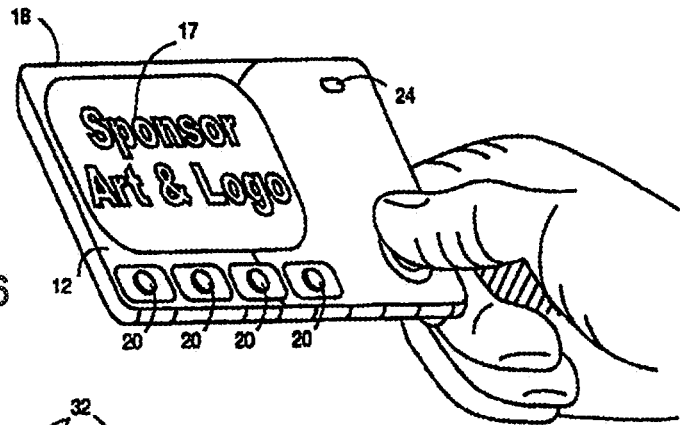
FIG. 6 is a perspective external view of another embodiment of an interactive card of one example of the invention.

FIG. 6 illustrates features of hand-held device 12, including the provision of aiming light 24 on front surface 16 of device 12. Aiming light 24 is typically included on embodiments of hand-held device 12 where video signals are optically received by device 12, such as to indicate that device 12 is positioned such that it is capable of capturing video signals emanating from a display device 10. When button 22 is pressed while the leading edge 18 of hand-held device 12 is generally oriented toward display device 10, received composite video signals on device 12 cause illumination of aiming light 24 to indicate that video signals are being received. Aiming light 24 illuminates for so long as data is being received, for a predetermined period of time sufficient to indicate that hand-held device 12 is oriented or aimed correctly, or for a long enough time period as to enable the encoded signals to be received by device 12. Aiming light 24 may be included on embodiments of hand-held device 12 where the video signals are electrically received to alert the user that auxiliary data is being received, such as through IR, RF, or the computer interface.

Figure 9:
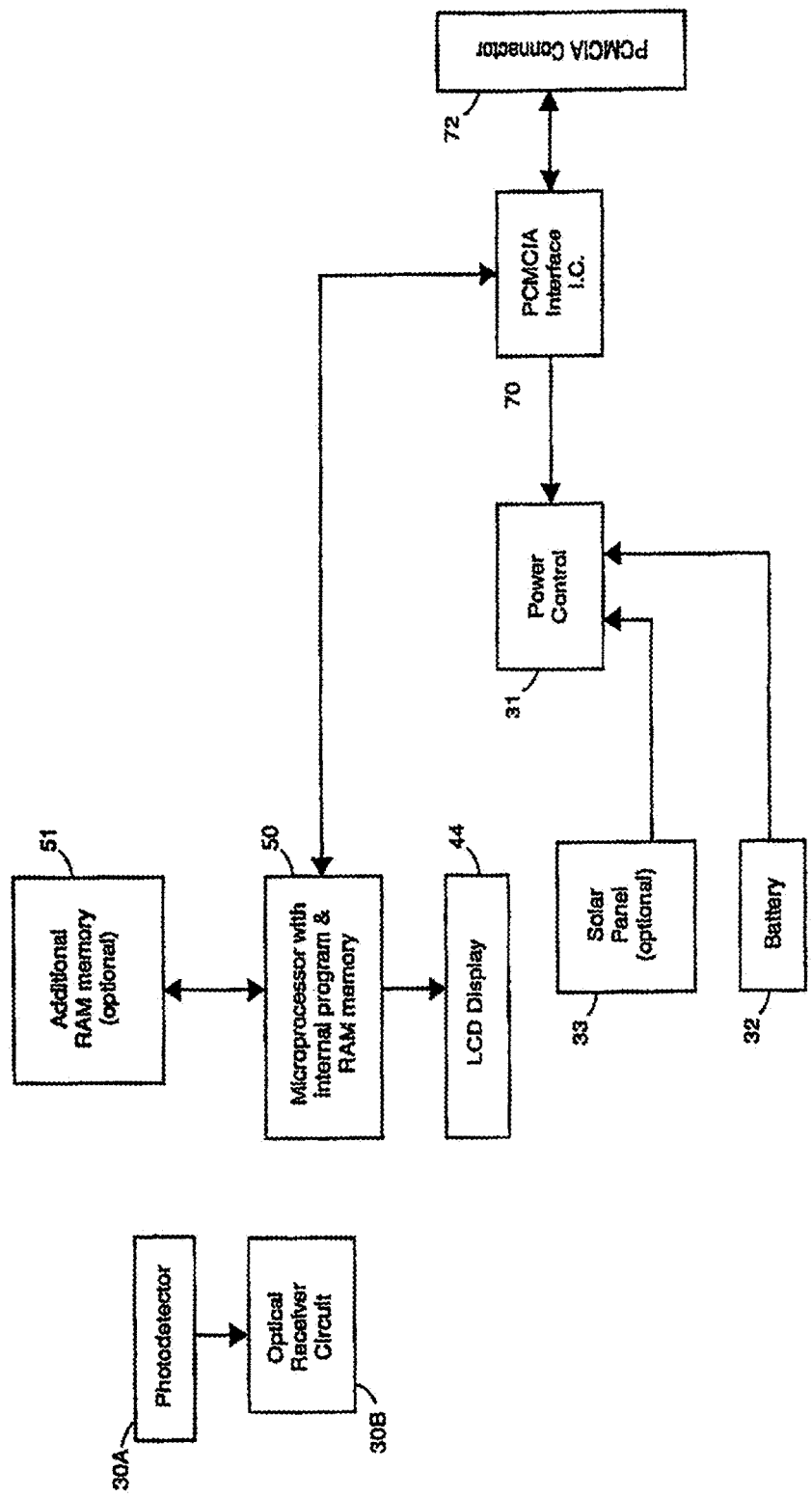
FIG. 9 is a schematic diagram of circuitry that may be used to provide various embodiments having circuit features evident in this diagram.

Referring to FIG. 7, the internal features of hand-held device 12 are illustrated. The features may be seen to include a printed circuit board 26 having integrated circuits 28 including push-button 22 and aiming light 24. Circuit board 26 is shown to include photocell 30. Photocell 30 is oriented so that it may receive light through a suitable aperture 36 (not shown) along leading edge 18 of hand-held device 12, which aperture 36 may be at locations as shown in FIGS. 2 and 3. Circuit board 26 is powered by one or more batteries 32 or other suitable cells (not shown), intended to provide sufficient power for operation of hand-held device 12 for days, weeks, months, or years. Batteries 32 may be used with other similar sources of portable power, such as solar cells 33 (as shown in FIG. 9). It will be appreciated in the art that the electronics of a PDA, cell phone, or other computer-like device capable of processing auxiliary data as described herein may contain a significant amount of additional circuitry to provide functionality unrelated to the present invention.

Three lights 20 are shown present on circuit board 26, and they may take the form of LEDs. However, as will be understood from study of FIG. 16, circuit board 26 may include the capability for more than three such lights. For example, it may include circuits for energizing up to nine LEDs.

Figure 8:
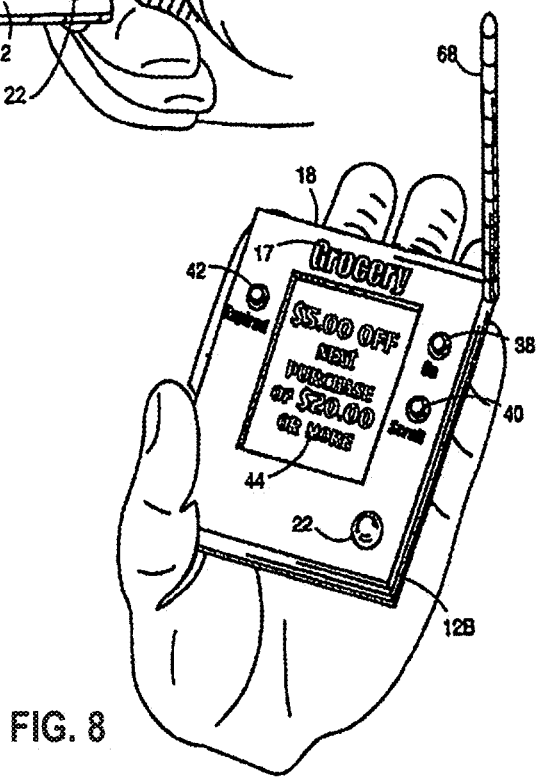
FIG. 8 is a perspective external view of another embodiment of an interactive card of one example of the invention.

Referring now to FIG. 8, an embodiment of hand-held device 12 is shown to include LCD 44. LCDs 44 capable of presenting the graphic content in monochrome or color are preferably used. However, LCD 44 may also be a textual display consisting of 16 digits, but less or more display capability may be provided based on usage and need.

Hand-held device 12 has power button 38 which when depressed will initiate operation of LCD 44 to display a coupon, a prize notification, or other information indicating receipt by device 12 of auxiliary data. For example, LCD 44 may be used to display a first coupon in a circularly linked list of offers. Power button 38 may also held to initiate receiving video signals, or may be used for other display or control purposes separately from button 22. Scroll button 40 allows a user to traverse, i.e. scroll, information retained or received by hand-held device 12, for example, the circularly linked list of offers received and stored on device 12. It will be appreciated in the art that any of the various buttons 22, 38, 40, or 42 may be implemented by using other "pre-existing" buttons (i.e., with other functionality) on hand-held device 12, such as the numbered buttons on a cell phone or shortcut buttons on the PDA. It will furthermore be appreciated that these buttons 22, 38, 40, or 42 may be implemented via touch screen, such that physical buttons 22, 38, 40, or 42 may be implemented "virtually" on hand-held device 12. Expiration button 42 acts in the manners disclosed in Koplar. Offers received by hand-held device 12 may be indicated not just by illuminating lights 20, but by textual information and graphics displayed on LCD 44 as may be observed in FIG. 6.

Figure 5:
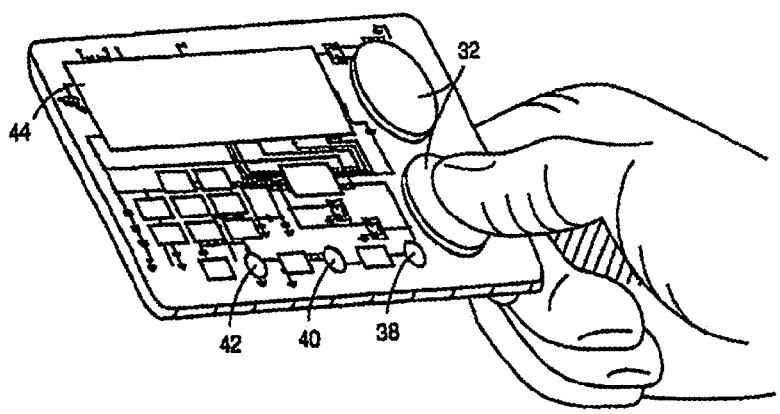
FIG. 5 is a perspective view of internal features of the interactive device of FIG. 6 of the embodiment of FIG. 8 showing an interactive card of one example of the invention.

FIG. 5 shows circuit features of the card embodiment of hand-held device 12 without housing 14. LCD 44 is evident, as are controls 38, 40 and 42, and a pair of batteries 32 located on the right side of the circuit board.

FIG. 9 shows a chart of an alternate embodiment of hand-held device 12 having an input-output means preferably in the form of a Personal Computer Memory Card International Association ("PCMCIA") interface, such as may commonly be found on a laptop computer. PCMCIA interface 70 of hand-held device 12 connects with PCMCIA connector 72 of a computer or computer-like device to transmit information back and forth. Connections with PCMCIA interface 70 to a computer are preferably made by a PCMCIA port, but the connection means may also be other known computer and computer-like slots, connections, and ports such as Ethernet, Token Ring, infrared ("IR"), RF, Small Computer System Interface ("SCSI"), Universal Serial Bus ("USB"), parallel port ("Parallel"), serial port ("Serial"), IEEE 1394 FireWire ("FireWire"), S/PDIF, AES/EBU, fiber optical cable, and Apple Desktop Bus ("ADB"). Hand-held device 12 may also utilize portable data storage, such as flash memory, mini-disc, or stick memory, to manually transfer information from hand-held device 12 to a computer. The types of connections used in various applications of hand-held device 12 may vary based on factors including cost, transfer speed, acceptance by industry, and user preference. Implementations of hand-held device 12 incorporating PCMCIA interface 70 and their methods of use are disclosed in Koplar and may be interchangeably used with one or more embodiments of the present invention.

Figure 10:
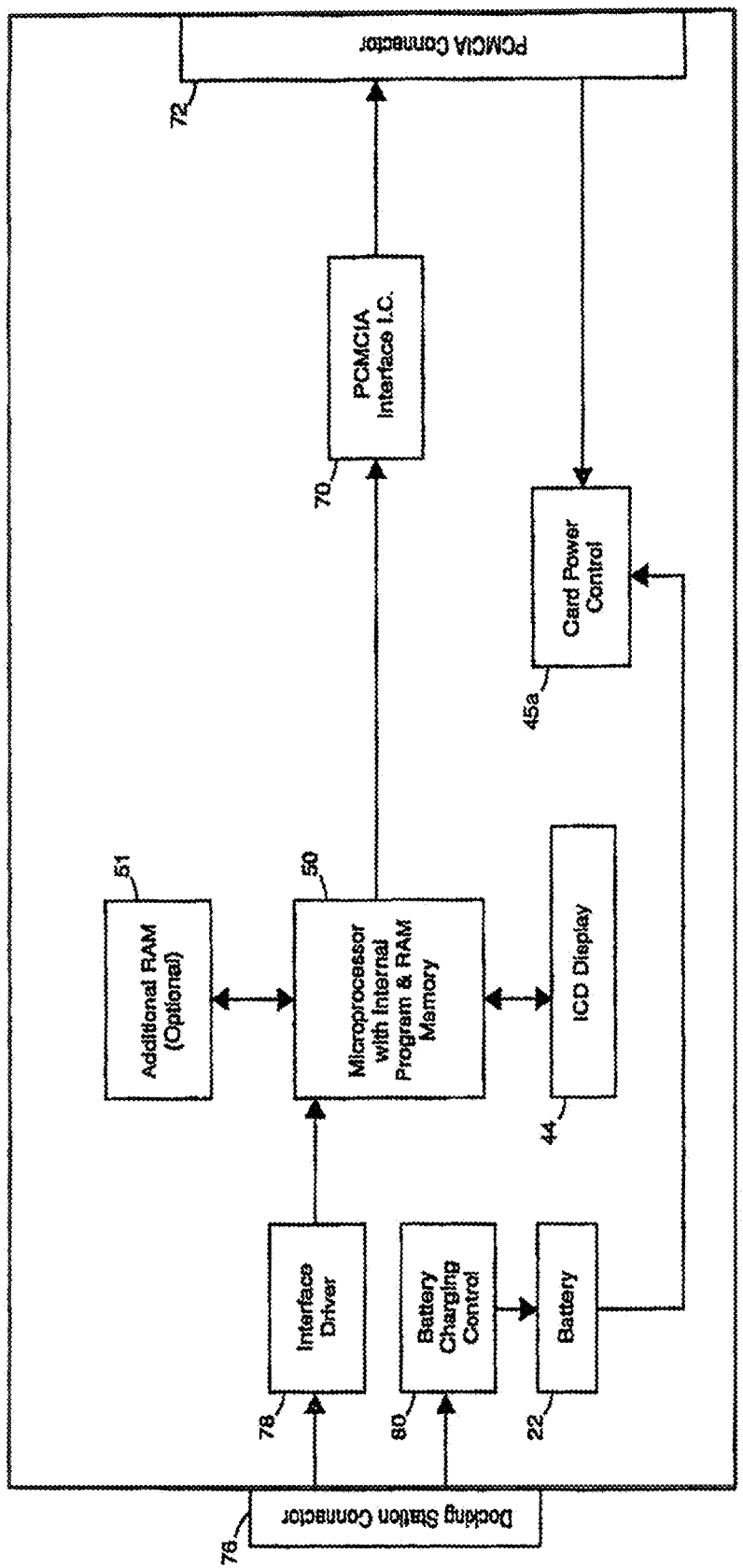
FIG. 10 is a schematic diagram of other circuitry that may be used to provide various other embodiments.
Figure 11:
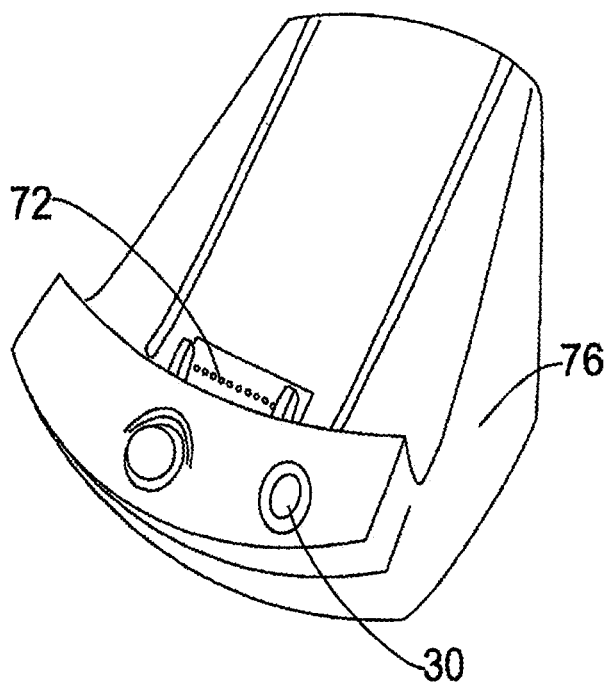
FIG. 11 is a perspective view of a docking station without a hand-held device.
Figure 12:
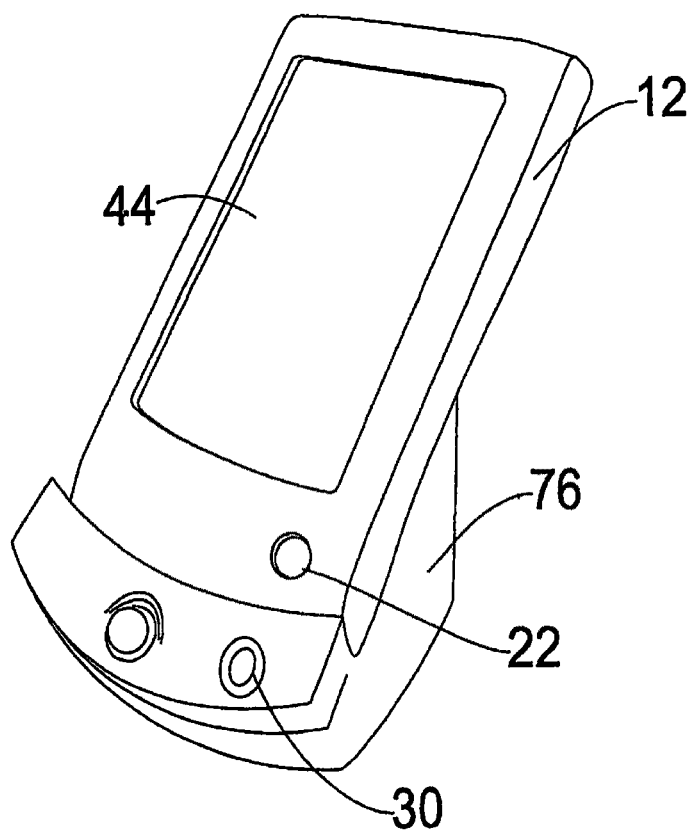
FIG. 12 is a perspective view of a docking station with a hand-held device.

FIG. 10 is another embodiment of the hand-held device 12 with an input/output interface in the form of a PCMCIA interface 70 and docking station 76 as shown. The docking station 76 may receive discriminated auxiliary data or composite video signals, and transfer either to hand-held device 12 by PCMCIA interface 70. Alternatively, as shown in FIG. 11, docking station 76 may contain photocell 30 so that it may be used to optically detect the video signal from a display device 10. Then either the entire video signal may be transferred to hand-held device 12 so that device 12 can discriminate the auxiliary data, or the docking station 76 can discriminate the auxiliary data and transmit the auxiliary data to device 12. The data may then be transmitted to hand-held device 12 by IR, RF, or by PCMCIA interface 70. FIG. 12 illustrates a manner in which hand-held device 12 may receive auxiliary data from docking station 76.

Referring back to FIG. 10, docking station 76 may charge battery 22 of hand-held device 12 by its battery charging control 80. Docking station 76 may implement various hand-held device 12 functions and advanced device 12 functions by controlling microprocessor 50 through interface drive 78.

Figure 15:
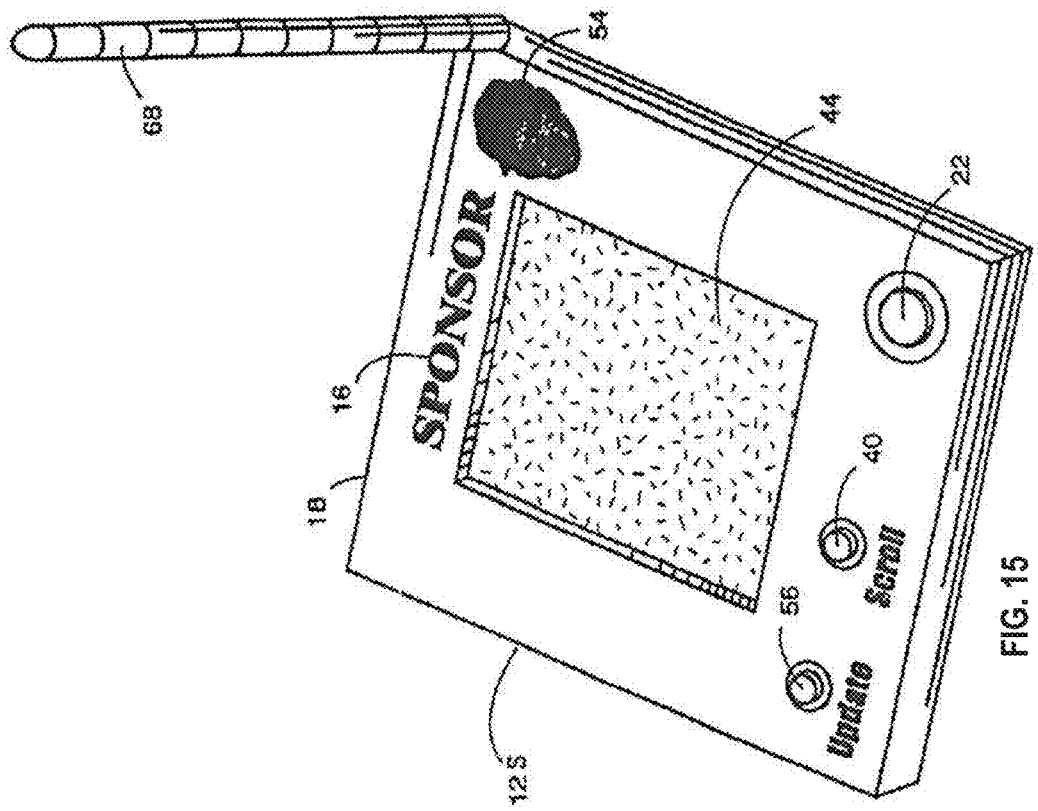
FIG. 15 is a perspective view of yet another embodiment of an interactive card of one example of the invention, and referred to as a sports card.

Turning to FIG. 15, a version of hand-held device 12 which may be termed a "sports" device 12S is shown. It includes housing 14 which is provided with front surface 16 which may include a visual field 54 for bearing the image of a sports contestant. In addition, LCD 44 is provided together with button 22 which allows a user to initiate operation of hand-held device 12, preferably with an RF antenna 68 oriented for receiving RF signals, or alternatively for optically receiving composite video signals through photocell 30 (as shown in FIG. 2), such as by holding hand-held device 12 so that leading edge 18 is generally towards display device 10 presenting a program relating to the sports celebrity or other person depicted on display device 10. Sports device 12S may be outfitted, configured, and used in the manners described in Koplar and herein.

Figure 14:
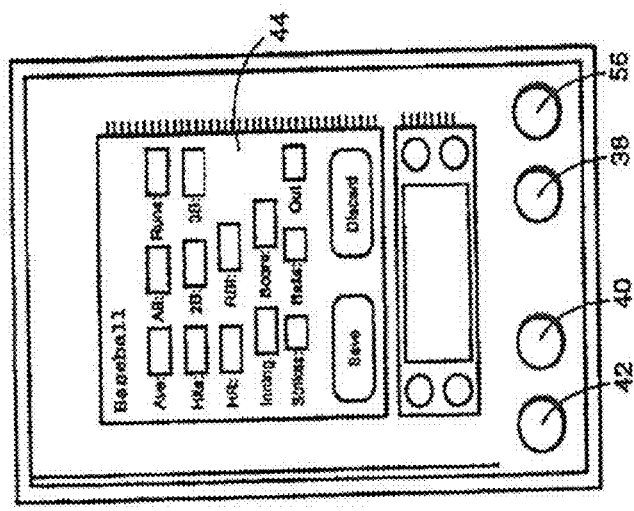
FIG. 14 is a front view of yet another embodiment of an interactive card of one example of the invention, and referred to as a sports card.

For example, as a celebrity batter takes his turn during a baseball game, television viewers direct their sports device 12S at display device 10 to receive composite video signals, or preferably configures their device so that they may electrically receive the auxiliary data. In both instances, viewers receive real time statistics about their favorite athlete during the telecast via sports device 12S. Additionally, the users of sports device 12S at a live sporting event may receive auxiliary information without the use of display device 10, such as by RF or IR. Thus, sports fans may get live statistics and trivia through use of their hand-held device 12 while they watch the game live and at home. Fans with obstructed views or sports fanatics may obtain additional information and have fun while enjoying a live sporting event. The information received by sports device 12S may take many forms including, as noted, statistics such as batting average, home runs, or other personalized information about the player that is stored in device 12 for future reference or updating. An example of such presentation is shown in FIG. 14. The stored information may then conveniently displayed on LCD 44 for the device owner by the push of scroll button 40 or update button 56, or otherwise transferred through a PCMCIA interface 70 to a computer.

Use of sports device 12S in connection with a baseball game is merely illustrative. Other sports in which players have statistics which change during play, over a year, or which may include information unique to the player, such as hometown or previous teams, may similarly be downloaded or conveyed by device 12S. Sports device 12S may also be used in connection with concerts and other special presentations. Users may acquire useful information about the concert or special presentation, such as the names of performers, set lists, the venue location and history, and related Internet addresses through receipt of auxiliary data on device 12. Persons with hearing impairments may receive real time text of live speeches on hand-held device 12.

Sports device 12S may be used to receive information relating to monuments, buildings, cars, animals, etc. during the course of a live or video presentation, wherein the transmission to device 12 contains auxiliary data.

Hand-held device 12 may also be used in trivia applications as follows: The user watches a trivia game show, such as the television show "Who Wants to a Millionaire?" The user may play along by utilizing hand-held device 12. The question is downloaded and received by hand-held device 12, either during the broadcast or prior to the broadcast, by use of auxiliary data and the methods described herein. The questions are synched to display device 10, such that when display device 10 first presents the questions, the auxiliary data triggers hand-held device 12 to display the question and possible answers. The user chooses the correct answer, or places the answer in order in a timely manner, or must otherwise comply with the rules of trivia game request in a similar manner to that of the contestants. The user receives points or credit for the correct or timely answer, based on various factors which may include the number of other at home users who answer correctly or speed of answer. The percentage of at home viewers either nationwide, local, or by other area may be displayed in real or delayed time either on display device 10, Internet website, or on hand-held device 12. Users may achieve regional or national rankings based on their performance. The final results from the various games may then be stored at a central database. Users who score high may receive recognition, a prize, or an option to play in a future televised game.

Hand-held device 12 may also be used other trivia applications as follows: User takes hand-held device 12 and appropriately configures it to receive modulated video from display device 10. During an event, such as the "Grammys", performers appear on the screen and perform a song. The user is then notified that a promotional opportunity is available, either through display device 10 or hand-held device 12. This preferably occurs as modulated video triggers a graphic rendering unit in decoder box 82, creating an icon to appear on display device 10. (Thereby not appearing on display device 10 of people who do not have such a unit.) Hand-held device 12 provides the user with an opportunity to purchase a song or album on which the performers appear. The money for the purchase may be made through online automation or a third-party Internet website, or may be entered or taken from a website. Alternatively, if the user so desires, an order requiring final approval and payment information can be sent to the user e-mail address. The user may then purchase the music in the following manners: directly, through a third party's website such as the affiliate program at "CDNow", or directly from the manufacturer. Otherwise, a link for the special purchase can be sent to the user's preferred e-mail address. Bonus or additional rewards may be sent along with the purchased product such as a bonus disc with previously unreleased material, live songs or videos, or future product discount. The user may choose to have the song sent in appropriate digital format to their e-mail account, or the selected song may become available for a period of time at a website for the user to download. Finally, the song could become part of a list that, when full to the length of a CD, the CD is automatically created and sent to the user. It will be appreciated in the art that this method of purchasing may be used with any other similarly sold products (such as jewelry on the "QVC network").

Another example of this technology is as follows: Any participatory game shows produced for television distribution, whether produced and distributed for broadcast, cable, direct satellite, or close circuit transmission; whether distributed by means of home video or DVD may be encoded with auxiliary data enabling viewers of programming material to decode either optically or electronically; process, store and display the data on hand-held device 12 for the purpose of winning prizes or accumulating points. Participatory type games include: (1) Games revolving around trivia questions dealing with subjects such as sports, music, news, movies; (2) Games revolving around Multiple choice questions; (3) Games dealing with true or false/yes or no type questions; (4) Games dealing with guessing letters; and (5) Games dealing with question revolving around Who? What? Where? When? How? or Why?

The viewer of display device 10 participates remotely either at home, at a public establishment such as a restaurant or bar, or in a hotel room, all by means of any properly outfitted hand held device 12, including smart cards, PDA type devices, electronic decoding boxes, cell phone or wireless handset. As the answers are decoded processed and stored in hand-held device 12, the viewer then chooses a response to the questions by depressing from a choice of buttons the correct answers. In case of devices with LCD display 44 such as the PDA, cell telephone, or wireless handset, the choice of answers might be display on LCD 44. By touching the choice with a stylus, pointer or finger, the answers are pre-defined by the televised show in determining the correct answers. Accumulation of winning answers are tallied within in the remote device and displayed by a numeric tally. Answers may also be in the form of an alphabetical display.

Point accumulation or winning combinations are then redeemable for various levels of prizes, and are redeemable by a program's sponsor at point of sale, through the computer or computer interface, or by the programs fulfillment process.

Thus, in the case of a national televised trivia contest, participants go to various sports bars where they are issued a play-along game piece. During the televised game, participants in the various sports bars across the country compete by guessing the correct answers and tallying points not only against each other, but also the studio contestants on the shows. The winning cardholder may be awarded a cash prize or other consideration including a possible appearance on the television show. The redemption may occur through hot syncing his card to the programs web site, to a sponsor's retail site, or other means of fulfillment. It will be appreciate in the art that this application may be utilized by any of the hand-held device embodiments described herein or with Koplar.

Figure 16:
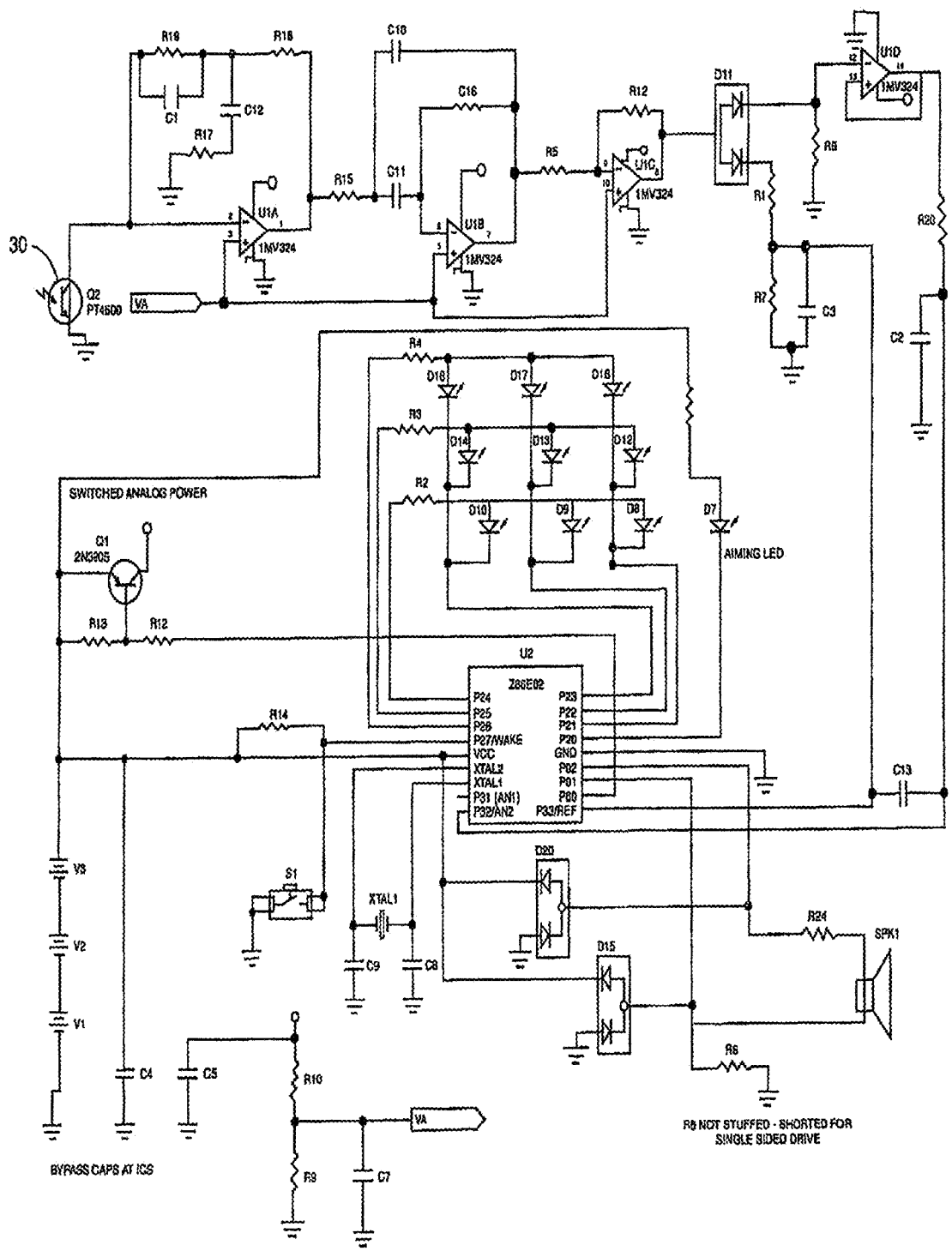
FIG. 16 is a block diagram of other circuitry that may be used to provide various other embodiments.

In FIG. 16, a schematic circuit diagram of one form of circuitry that may be used to provide the features and functions of the several embodiments described herein, elements are identified by their conventional numerology conventional characters proximate of the elements. Optional photosensor 30 is seen to be constituted by a photodiode or phototransistor Q2 which provides the signal to amplification and filter circuit consisting of an operational amplifier U1A including a circuit consisting of the components of C1, R19, R18 and C12 interconnected between the output and the inverting input of operational amplifier U1A, and so providing an amplifier and filter. Thus amplifier and filter signal is provided through R15 to a filter and frequency shaping circuit comprising of an operation amplifier U1B having in its feedback circuit the components C10, C11 and R16. These circuits provide a filtered, frequency-shaped output through a resistor R5 through a circuit consisting of operational amplifier U1C and resistor R11. Operational amplifier U1C has an output coupled to a diode pair D11 which thus provides a pair of outputs, the upper to a circuit comprising an operational amplifier U1D, providing in effect a buffer whose output is a data signal delivered through a resistor R20, and the lower of the diodes D11 providing a signal through a resistor R1 to a further resistor R7, across which is a capacitor C3. The node between resistors R1 and R7 provides 16 kHz signal that is of the horizontal line scan rate or frequency television display optical signals received by photosensor 30 (Q2). The horizontal scan frequency of conventional NTSC color signals is, more precisely, 15.625 kHz. (approximately 16 kHz, as here described). Similarly, the discriminator circuitry provides at the output of operational amplifier U1D an 8 kHz signal representative of the auxiliary data received, as produced by alternate-line luminance modulation of the display. The discriminator circuit thus described provides both the 16 kHz and 8 kHz (more precisely, 7.8175 kHz), which constitutes the actual data, and determines whether the 8 kHz data carrying the information (data) content of the received auxiliary data is present by determining whether average signal magnitude of the 16 kHz or 8 kHz signals is greater, so that if auxiliary data is present, e.g., there is 8 kHz modulation energy in the received light signals, they are provided to a microprocessor of the U2 of the circuit for decoding the information content within the 8 kHz signal. Thus, the received composite video signal is amplified and filtered to de-emphasize the 16 kHz signal and retrieve the 8 kHz signal carrying the data. For example, wave shaping and frequency shaping filter circuits provided by operational amplifiers U1A & U1B de-emphasize the horizontal retrace frequency and amplify the half-frame rate carrying the data content of interest. The circuits filter the frame rate signal and use it as a reference to compare its relative signal magnitude against the 8 kHz data-carrying signal. If the retrieved 8 kHz signal is of greater magnitude than the conditioned 16 kHz signal, auxiliary data is present and may be utilized by the processor. Microprocessor U2 is preferably of commercially available type Z86E02, and operates according to machine instructions stored in its resident ROM memory. Flowcharts of the functions performed by the machine instructions are set forth in the appendix. Although not separately shown microprocessor U8 includes random-access memory (RAM or DRAM) in which decoded data is stored. Thus, microprocessor U2 is to decode and store, or store indication of, the data present in the 8 kHz signal, as by illuminating one of more of the LEDs and causing them to remain on as evidence or indication of the data, substantially in accordance with the teachings of Broughton, and to drive displays of the device and/or its LEDs or other signal devices, as well as to provide any audio function, as well as also to energize an aiming LED7 when auxiliary data is present. So also, if desired, a signal may be driven by U1 in response to the presence of the auxiliary data, thus providing an aiming light function indicating, in simple effect, that the hand-held device is receiving composite video signals.

For providing illumination of lights 20 or 20a-20d described above in connection with the various embodiments, shown here are nine LEDs D9-D18. It will be understood that not all of these LEDs need be used for a specific embodiment of hand-held device 12. That is, the circuit may be configured so as to drive one, two or three or more of the LEDs as according to the desired function and use of the device.

Shown adjacent microprocessor U2 are two diodes D15 and D20 which are used to bypass any noise generated from the microprocessor. The speaker SPK1 is element 34 shown in FIG. 7. A clock crystal XTAL1 provides 8 MHz clock signal to microprocessor U2. Capacitors C8 and C9 are part of the clock circuit.

Immediately adjacent to the clock circuit is a switch 51 to provide the function of button 22 in the several embodiments for initiating operation of the device. Switch 51 is tied to a power supply circuit comprising power cells a resistor 14, V2 and V3 (each of 1.5 v potential), and a resistor 14, and including a switched analog power circuit comprising a transistor Q1 and resistors 12 and 13 which enable power to be provided to the array of LEDs D8-D18.

Figure 17:
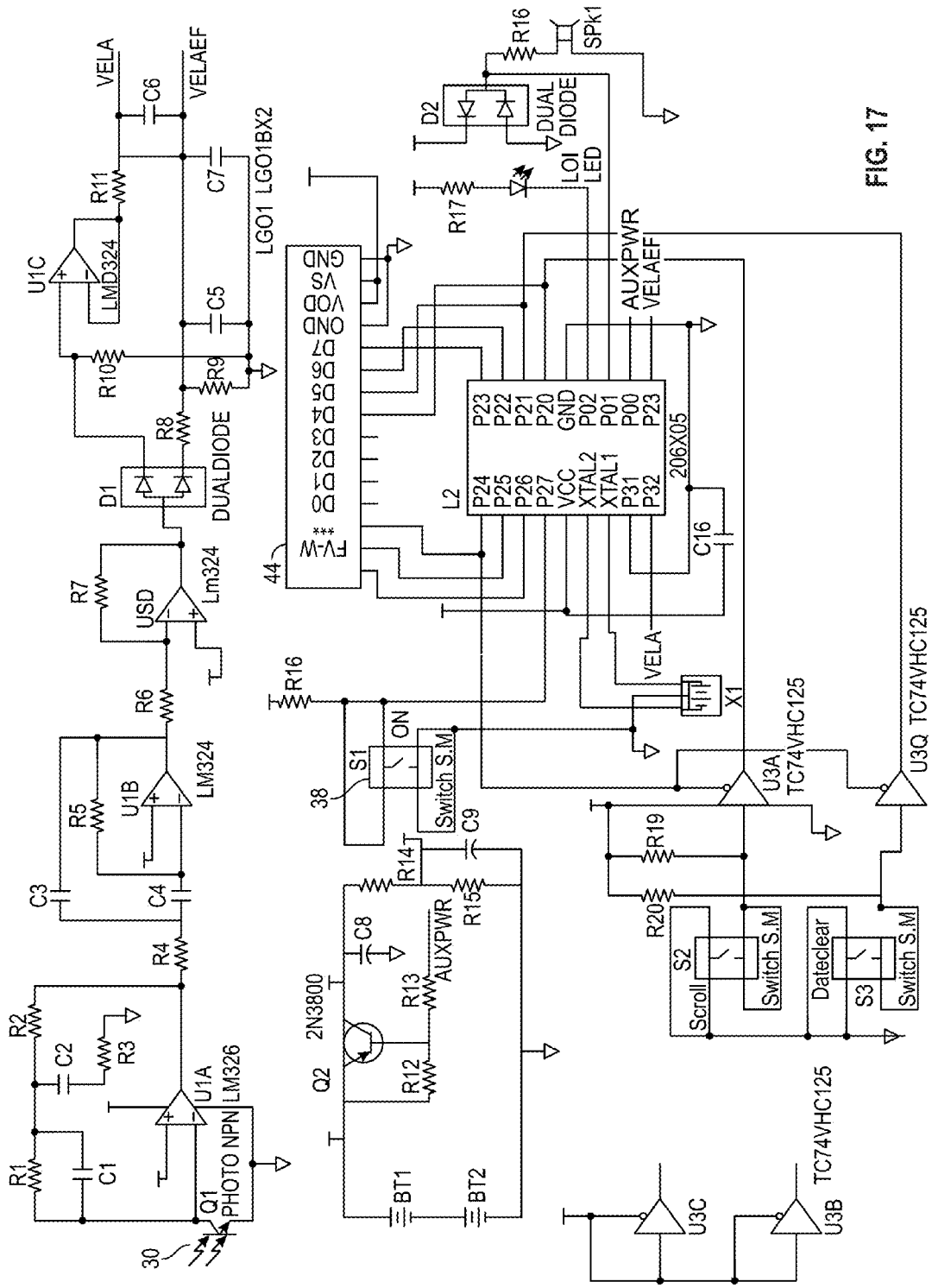
FIG. 17 is a block diagram of other circuitry that may be used to provide various other embodiments.

Referring to FIG. 16, there is shown in FIG. 17 another version of circuitry invention is shown which may be used to provide still other embodiments of the hand-held devices of the inventive subject matter. It includes a microprocessor U2 which may of commercially available type Z86X08. It is similarly provided with 8 kHz and 16 kHz signals (more precisely 15.635 kHz and 7.8175 kHz) which respectively constitute the horizontal retrace signal and the data signal at half of that frequency, since the auxiliary data encoded on alternate horizontal lines and so is effectively present at only half the horizontal scan rate, as explained above. These signals are identified as VEILA and VEIL REF that are provided as inputs to microprocessor U2. Therefore, it will be understood that operational amplifier circuits consisting of operational amplifiers U1A, U1B, U1C and U1D provide the same functions of amplification, filtration, frequency shaping and discrimination, as well as buffer circuits described in FIG. 16. The microprocessor, clocked by crystal X1 at 8 MHz, decodes the data provided by the composite video signal, stores it in internal RAM or DRAM and drives an LCD 44 illustrated as circuit component LCD 1 which may be, as shown, a 16-character by 2-line display. It may instead be a 12-character by 3-line display, for example, or other format appropriate for the display message to be presented at the surface of the device.

Power for the circuit is provided by two cells BT1 and BT2 of 3 volt potential to a circuit including Q2 to provide not only main power by auxiliary power, the latter being delivered to the microprocessor for maintaining its continued operation, such as for date and time keeping even when the display is not being operated and collectively referred to as battery 22. A switch S1 is provided for performing the function of power button 38 (as shown in FIG. 8) in the several embodiments and, when pressed, enables power to be provided to the LCD1 and other switching functions may be provided by switches S2, which controls scrolling of the LCD 44, and switch S2 may be actuated by scroll button 40 shown in FIG. 15. Similarly a switch S3 provides a date function that may be actuated by expiration button 42. These signals control inputs to operational amplifiers U3A and U3D, respectively, and these are provided as inputs to the operational amplifier and also to LCD1. The clear switch will, when operated as described above clause clearing of the date, and the scroll switch enables the user to cause the message across the LCD 44 as that in FIG. 8. Operational amplifiers U3C and U3B provide voltages useful according to the connection illustrated.

The circuit embodiments shown are used in conjunction with a method for producing a composite video signal containing video program material and control data, and displaying the signal on a television and decoding such control data for ancillary use, wherein the method includes modulating at least one video field within the viewing area of a television in such manner that the modulation is substantially invisible to the television viewer, thereby producing a video subcarrier component of the signal (which is as indicated detectable at an 8 kHz rate) containing the data; and detecting the component to reproduce the data for the ancillary use. Although luminance modulation is particularly useful for that purpose when using hand-held devices in accordance with the invention, chrominance modulation may instead be employed as according to Broughton. Furthermore, the improvements in modulation described in Ciardullo may likewise be used. Various alternative modulation (and corresponding modulation) schemes may be employed as alternatives, including (but not limited to) amplitude shift keying (ASK), frequency shift keying (FSK) modified frequency shift keying (MFSK), and phase shift keying (PSK). And although the substantially 8 kHz data-carrying submodulation is at half the NTSC horizontal scan rate, other submodulation techniques may be used at other multiples or submultiples or other periodic rates which are other functions of the horizontal scan (retrace) rate.

Figure 18:
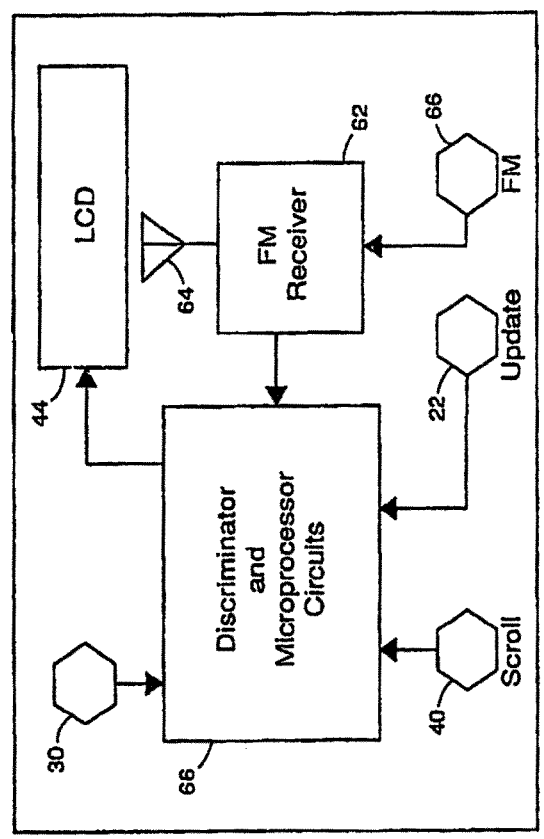
FIG. 18 is a block diagram of other circuitry that may be used to provide various other embodiments.

FIG. 18 is a block diagram of circuitry of yet another possible embodiment of the interactive hand-held devices, designated 12F, which shows discriminator and microprocessor circuits 50 which are in accordance with FIG. 16 or 17, and receiving composite video signals by photosensor 30 so as to decode the auxiliary data and provide either light signals as described above, or, preferably, to drive LCD 44 according to the foregoing description. Thus, it includes an update or initiating button 22, as according to the sports device 12S and which begin the process of optical detection. In addition, an FM receiver 62 and associated antenna 64 (collectively seen as RF antenna 68 in FIG. 2) may be provided as a surface-mount module added to the printed circuit board of the device. FM receiver 62 and associated antenna 64 may be of commercially available design, suitable for being powered by battery 22 or cells (not shown) provided in accordance with the foregoing description of various embodiments. Control button 66 may optionally initiate operation of FM receiver 62 so that it sends FM-demodulated signals to microprocessor circuits 60. The FM receiver 62 can be any type of RF antenna that is of the size and accordance with the inventive subject matter, such that the discrimination may take place on a decoder, and the results are sent to the hand-held device 12 via RF.

Hand-held device 12F may be sports device operating otherwise according to version 12S described in relation to FIGS. 14 and 15, but the addition of FM receiver 62 gives the new device the capability of being used in sports stadiums and other performance venues where video signals are not available. Thus, the device 12 may receive either optical signals or electrical signals. In the case of a sports device according to FIGS. 14 and 15, the user may as described above receive statistics about a player depicted on the device, or about a player at bat. According to a preferred method of using device 12F, the same auxiliary information as would be transmitted via a television broadcast for being received on a display device 10, there to be displayed as composite video signals, is in addition transmitted by low-power FM signals in the FM broadcast band of 88-108 MHz. For this purpose, FM receiver 62 may be pretuned to an appropriate frequency for such low-power signals. The FM signals may include batter statistics, for example, as batters come to bat, so that holders of the new devices 12F may update their devices as their preferred batters come to bat.

Hand-held devices 12 may have use in various sports events, entertainment presentation, conventions, museums, tours, and guided events at which holders of devices might not conveniently use them while in the presence of a television display carrying auxiliary data, but where the location in which the devices will be used will permit low-power FM or other RF signals. Other commercially significant usage of the devices of FIG. 16 can be made, similar to the methods of using the previously described versions. Similarly, hand-held devices 12 may be adapted to receive AM signals, or auxiliary light signals such as IR (infrared) light signals, different from the composite video signals.

Similarly, hand-held devices 12, whether or not sized as "cards", PDAs, or cell phones or other conveniently hand-held size, and whether in the form of racing devices, may simulate other objects, vehicles, personalities, or devices for house-hold, personal or business use, so as to provide a verisimilitude or facsimile representation of such devices or usage, so that the hand-held device suggests to the user the manner of its use, or conveys to the users special feeling, sense, identity or association with a field, activity, sport, entertainment or other use of the device it represents. In games, for example, in which some or all of the information content useful in the game may be provided by auxiliary data, hand-held devices of the inventive subject matter configured to provide a verisimilitude or facsimile representation of such devices or usage may give players of the game enhanced sense of play, participation or gaming identity. The foregoing examples are merely illustrative of the many possibilities.

When used in a system for deriving benefit from encoded data including means for producing video signals modulated with auxiliary data, such as by providing commercially sponsored television programming including auxiliary data, hand-held devices 12 of the inventive subject matter can have special impact for television response, advertising and promotions, as the new system and devices are useful in providing, among others, the following commercially advantageous results when they are distributed to viewers and used by viewers to receive auxiliary data transmitted with normal programming content, which may include advertising, promotions and other sponsored transmission.

Another feature of the inventive subject matter is the desire to have an improved method of redemption for hand-held devices 12. A method for hand-held device 12 redemption is described in the context of an optically loaded card 120. However, such a method could also be employed with other hand-held devices 12 that have coupon redemption requirements. The components of an electronic couponing card 120 which support the method for card 120 and value redemption include:

1.) LCD 44 or other human readable method to display data,
2.) On board computation to sequence the logic defined below,
3.) A method to load "electronic coupon" information onto card 120,
4.) Buttons 22 or other method (such as a touch screen) to sequence through the coupons loaded on card 120,
5.) Button 22 or other method (such as a touch screen) to put the card in "redeem" mode, and
6.) Laser detection hardware described below.

Presently, most POS systems use a computerized cash register tied to inventory management software and bar code scanning hardware. One embodiment of a method of using an electronic coupon card 120 and existing hardware and software located at a POS for electronic coupon redemption is described in the following steps:

1.) Coupon data is encoded onto a video signal, e.g. television signal. The encoded data also contains additional text describing the coupon along with a numeric code to be entered at the POS.

2.) The user points the multi-use card 120 at the television screen when the television signal containing the coupon data is airing. The electronic coupon data is then captured by card 120 by optically receiving the data that is presented on the display. The coupon data could also be captured with methods other than optical detection, including but not limited to radio frequency (RF) or hard-wired electronic data transfer.

3.) After capturing the electronic coupon data, the user can then view coupon information such as requirements, valid dates, valid POS locations, etc. on LCD 44 of card 120. (Other numeric codes described in the following steps that are used for identification and security purposes are not available for viewing by the user at this time).

4.) When the user desires to redeem the electronic coupon, card 120 is transported to a POS and the user buys the desired item or otherwise follows the requirements of the coupon offer.

5.) At the check out, the cashier takes card 120 and locates the correct coupon using the scrolling function (usually a button) of the card 120, in concert with viewing the data on LCD 44.

6.) The cashier then presses the required "redeem" button on the card. The cashier then has approximately one minute to complete steps 7 and 8 below. Requiring this button to be pressed reduces the likelihood that a coupon will be accidentally redeemed through bright ambient light.

7.) When the correct coupon is located, the card is held with LCD 44 facing the cashier and the back of the card facing the bar code scanner located near the cashier. The bar code scanner is the same scanner that is used for purchases and conventional paper coupon redemption.

8.) When the scanning laser light is detected by card 120, the card beeps and the numeric code described in step #1 is displayed on LCD 44. In addition, another code that represents the serial number of card 120 is also displayed. The second number displayed may also be a special code generated as a combination of the downloaded numeric value (step #1) and a hidden internal (to the card) serial number. The second number can be generated by various standard encryption methods and may be used to increase the security of the transaction because it would uniquely identify card 120 and transaction but would not be easily duplicated.

9.) The cashier then has 30 seconds to enter either the numeric code only or both the numeric code and card serial number (for greater security). After 30 seconds, card 120 automatically erases the coupon. The coupon may also be erased quickly by a press of the "redeem" or "scroll" keys during the 30 second period. (The scroll key is used to allow multiple coupons to be located and redeemed efficiently as described below).

10.) If additional coupons are to be redeemed at the same time, the above steps are completed for the first coupon. Additional coupons are redeemed with the cashier repeating steps 5 through 9 above.

In an alternative embodiment, steps 8, 9, and 10 are replaced with the following steps:

8'.) When the scanning laser light is detected by card 120, card 120 beeps and displays a numeric code, or alternatively an alphanumeric message, on LCD 44. In addition, another code that represents the serial number of card 120 is also displayed. The second number displayed could also be a special code generated as a combination of the downloaded numeric value (step #1) and a hidden internal (to the card) serial number. The second number can be generated by various standard encryption methods and could be used to increase the security of the transaction because it would uniquely identify the card and transaction but would not be easily duplicated.

9'.) The cashier, upon viewing the number code or alphanumeric message, can determine whether or not the triggered card is the card that was pre-selected to win a prize or to receive a special value or discount. If the card alerts the cashier that a prize has been won, the cashier may optionally enter the second number (step #8b) into a database to verify that card 120 has not been tampered or altered. The prize may also be erased quickly by a press of the "redeem" or "scroll" keys during the 30 second period. (The scroll key is used to allow multiple prizes to be located and redeemed efficiently as described below).

The following describes how detection of a laser scan across the card can be accomplished: Almost all bar code scanning devices use a red laser of either the helium neon (HeNe) or diode types. The scanners deliver an extremely bright light in the 832.8 nanometer (nm) wavelength for the HeNe or 640 nm wavelength for the diode lasers. The wavelength spread for a laser is extremely small, which allows for narrow optical filters so that non-laser ambient light can be filtered out. A simple electronic/optical circuit is shown in FIG. 19 and can be used to detect the signal.

Figure 19:
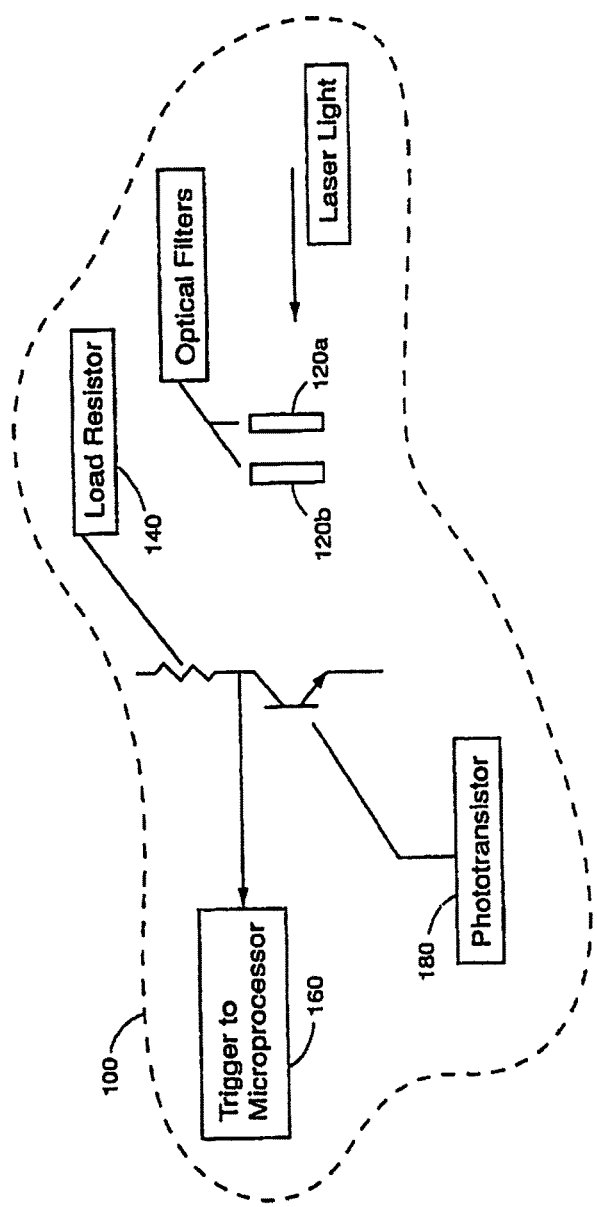
FIG. 19 is an electronic/optical signal detection circuit.

As shown in FIG. 19, electronic/optical circuit 100 includes optical filters 120*a* and 120*b*, load resistor 140, microprocessor trigger 160, and phototransistor 180.

Optical filters 120*a* and 120*b* are used to prevent the electronics of the card from being triggered by ambient light, e.g. bright sunlight. Optical filter 120*a* is a neutral density type to reduce the intensity of light and optical filter 120*b* is a red bandpass type.

A photodetector is required to detect the laser light. This detector can be phototransistor 180 since only an ON/OFF signal is required. Phototransistor 180 has a small resistive load on it, as represented by load resistor 140 so that phototransistor 180 is less sensitive to light. Load resistor 140 therefore reduces unwanted triggering.

The output of electronic/optical circuit 100 is fed into a microprocessor on the card where the output then becomes the trigger that causes the beep, etc. as described in the above steps.

There are complexities when encoding signals in real-time video displayed by monitors, such as with computer monitors. As described in Ciardullo and Broughton, the substantially invisible signal methods encode with one video display line brighter and one line dimmer throughout the entire monitor. Using a constant stream of encoded video content with computers requires low-level devices drivers that are difficult to coordinate with the computer operating system and the video card that it controls. Monitors, unlike traditional televisions where the video content is formatted prior to its reception, generate the video content at the operating system level, such as with Microsoft™ Windows™, by use of a video card. It is therefore difficult to control the display of a computer monitor unless the video data is generated from an application program that makes calls to the operating system to display requested data.

The present system utilizes computer software and hardware including the operating system, application program, video card, and monitor, as well as a hand-held device to receive data by the user. Under the present system, the application program needs to be executed so that it will begin to transmit its data. The preferred method to initiate an application program is to trigger the start of the application program on specified user interactions with Microsoft™ Internet Explorer™ or similar web browsing software.

When users interact with their web browser by moving the mouse and clicking or double-clicking, the web browser can selectively execute the application program on specified events. The application program is stored as a dynamic link library (DLL), such that the web browser can call and initiate the DLL on events where the web browser determines that it needs the DLL file. Installation of the DLL plug-in prior to initiating one or more embodiments of the present invention may occur so that the web browser can call the application program. When a user attempts to provide interactions to their hand-held device for the first time by utilizing the web browser, the appropriate web site will perform an action that may require calling the application program. The user will then be prompted by the web browser for the user's permission to download and install the DLL. After installation of the DLL, the action that the web browser wanted to fulfill will execute and the desired results will occur. Alternate arrangements of the present invention may be used, as the application program may be configured to be a stand-alone program or otherwise integrated within another application program.

The application program is initiated when the user performs various actions at points throughout the website being explored with the web browser. Upon initiation, the application runs and there is an image displayed on the monitor so that the user can capture the data received from the image on their hand-held device. In one embodiment, the image will appear in the title bar of the maximized web browser. The image may, however, be located anywhere on the monitor that is visible. For example, the image may appear in the eyes of a pumpkin and people with an appropriate hand-held device could thereby capture the opportunity or benefit on their talking scarecrow doll (hand-held device) that interacts with a ghost story. Furthermore, the image is not limited to a box shape; it may be virtually any shape capable of displaying a large enough image so that users at a specified distance from the monitor can capture data.

The stream of data received by an optical detector of the hand-held device is used to trigger actions on the device or to pass data directly to the device for its use. Data received by the hand-held device can be used in multiple different ways, including those mentioned herein and in Koplar.

In one method of the present invention, the data received by the hand-held device acts as a trigger initiating action on the hand-held device. The device, upon receiving data, looks to see if the data it received matches one of its triggers. For example, if the hand-held device is in the form of a plush mouse, and the mouse receives a trigger that initiates a phrase such as "Hello boys and girls", then upon receipt of the trigger the device will repeat the specified phase. Triggering the device optimizes the amount of data that needs to be passed to the hand-held device.

The inventive subject matter described herein includes a mechanism to receive data on a hand-held device from the computer or the Internet without wires. Under one embodiment of the present invention, there is no feedback path from the hand-held device. However, it will be appreciated that the hand-held device may be enhanced with means for feedback by including RF, IR, USB or other means described in Koplar. The hand-held device may collect data and utilize opportunities received from data collection by any of the means described herein or in Koplar.

Under one embodiment of the present invention, a communication path is established to send data streaming from the monitor to the hand-held device. The data is sent by strings of ones and zeros from a varying visual image on the monitor. Ones are detected when the image emanates the frequency, and zeros are detected when the image emanates no frequency. Thus, under one embodiment where the image is shown in the title bar of a web browser, a solid white color in the title bar indicates that no frequency is present and alternating white and black lines indicate that frequency is present. For each instance in time for which the hand-held device is active and its optical detector faces the monitor, if it reads the alternating white and black lines a data bit of one is recorded, and if the lines have not be ready a data bit of zero is recorded. By varying the appearance and frequency of the display of the colors on the screen, data can be transmitted to the hand-held device.

A complexity in transmitting the data to the hand-held device under one embodiment of the present invention is the differing computer, monitor, and video card configurations transmitting the data. Depending upon the configuration, the visual image on the monitor will vary to transmit the proper frequency to the hand-held device. Further, the bit per second transmission rate of the monitor will vary with the refresh rate. The inventive subject matter may act independently of the computer configuration as will be described in more detail below.

The monitor typically has a CRT tube which draws a picture across the computer screen and continues down the length of the monitor from top to bottom before beginning with the next reiteration. The monitor emanates an image containing a frequency that the device during each successive refresh (e.g., redrawing) of the screen. During each refresh, an image will display on the specified section of the monitor either indicating that a frequency was present or was not. The hand-held device looks for that specific frequency and records a data bit based on its result. If the frequency displayed by the image is 18 kHz, the hand-held device on each refresh of the monitor will detect whether an 18 kHz image is present. If the 18 kHz image is present, the data bit present is a one; otherwise, the data bit present is a zero.

Under one embodiment of the present invention, the device receives a binary data stream and one bit per monitor refresh. If the monitor refreshes at 60 Hz, there are 60 bits of data transmitted to the hand-held device in one second. At every monitor refresh, the hand-held device will look to see if the frequency was present or not. If the frequency is present the hand-held device records a data bit of one, and if the frequency is not present the device receives a data bit of zero. The binary data stream provides the data, which can be used as a trigger or stored.

An example of the foregoing is as follows: The application program wants to send a binary code of 1011 to the hand-held device at a frequency of 18 kHz. When the monitor draws one field (i.e., one picture on the screen), it puts the 18 kHz image on the screen. The optical detector of the hand-held device reads the monitor, detects the 18 kHz image, and records a data bit of 1. On the next refresh, the application program wants to show a data bit zero and so it erases the image on the screen and puts up a white block (e.g., thereby not containing the 18 kHz image.) When the hand-held device looks again at the monitor, it does not detect the 18 kHz image and therefore records a data bit of 0. The card thus so far has received data bits of 1 and 0. On the next refresh, the monitor displays the 18 kHz image and the hand-held device reads the image and records a data bit of 1. On the final refresh, the monitor leaves the 18 kHz image in place and the hand-held device again reads the image and records another data bit of 1. Thus, the card read the code from the application.

The data signal is preferably sent multiple times to insure that the hand-held was positioned appropriately and not too much outside interference impeded the transmission. The hand-held device may be set to use each data bit it receives, or it may compare the results of the stream it received with the previous stream to ensure that the same data bit is not replicated within the device. An event manager on the hand-held device may make determinations as to what happens when data is received.

As briefly described above, one embodiment of the present invention acts independently of the computer configuration. The application program runs independently by varying the image based on the standard horizontal frequency. The horizontal frequency differs with every monitor setup. The horizontal frequency is determined by 3 factors including the number of pixels on a line, the number of lines in a picture/screen, and the vertical refresh rate. Therefore, video cards configured of differing resolutions will have different horizontal frequencies. The differing horizontal frequencies impact the frequency at which the image on the monitor is displayed, and therefore the horizontal frequency is taken into account by the application program when displaying the image.

For example, if a computer video card is configured to run a monitor in 800×600 running at 60 Hz have and the desired image frequency is 18 kHz, the image will have one line set to white, the second is black, the third line white, and fourth line black, and so on. The result of that is an image frequency of 18 kHz. If the video card was configured to 1024.times.768, the first 11/4 lines white need to be white, the next 11/4 lines black and so on to get the 18 kHz frequency.

The application program makes the adjustment based on the horizontal frequency. Operating systems such as Windows make the number of pixels per line and the number of lines per screen available. A statistical testing program measures the vertical refresh rate by recording the time it takes for screen drawing to occur. The application program then stores the configuration in the windows registry. The registry is data stamped so that on a daily basis the application will re-run this configuration program. It will be appreciated in the art that then statistical data could however be stored in alternate locations, and that other variations of time stamp checking could occur.

The hand-held device may be any of the configurations suggested in Koplar or herein, including smart cards, cell phones, PDAs, toys, and plush animals. In one embodiment, a single limiting factor of what type of hand-held device 12 that may be used is the device 12 includes an optical detector 30 or other means of reading the image from display device 10, and the technology within device 12 to interpret the received data. The technology for processing the data as described below could be implemented in hardware, software, or a combination of hardware and software.

The optical detector of the hand-held device acquires the light from the direction of the computer monitor and filters out the non-usable frequencies. The hand-held device first processes the received data to determine what image was present. The band pass filter eliminates leftover signal noise and leaves any present image frequency. Thus, the signal leaving the band is either something or nothing. The rectifier takes the absolute value of the signal and adds it to the integrator. The integrator accumulates each portion of the image signal received in each refresh to determine if the signal received was an image or noise. If there is sufficient signal to conclude that a signal was present, the micro controller reports a value of one; otherwise, a value of zero is reported.

The hand-held device determines how frequently it must sample the monitor. The signal after its original filtration also proceeds to an envelope detector, which attempts to match the signal received to various monitor refresh rates. The matching results are passed to the vertical sync reconstruction to determine which of the standard refresh rates the monitor is using. The application program thus transmits sufficient information along with the data to the hand-held device so that the device can determine the horizontal frequency of the computer monitor and determine how many times per second it must look for an image and record data bits.

Figure 20:
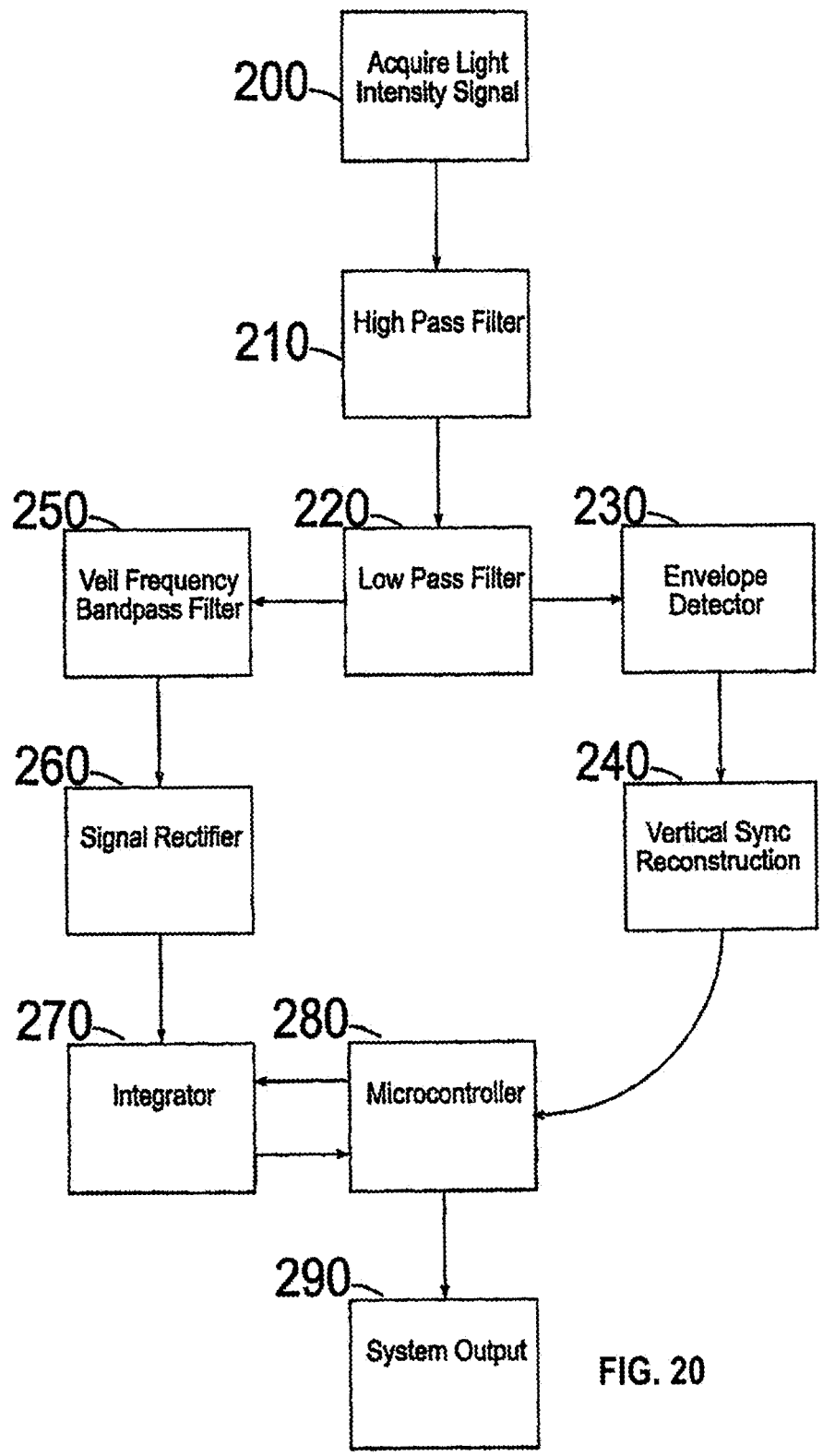
FIG. 20 is a block diagram of the method of optical detection from a monitor by a hand-held device.

Referring to block diagram FIG. 20, it may be observed that light is first acquired 200, then processed through a high pass filter 210 and low pass filter 220 to detect the auxiliary data as described above. A first portion of the signal is then processed by envelope detector 230 and vertical sync reconstruction 240 to determine the configuration of the monitor, the results of which are passed to the microcontroller 280. A second portion of the signal travels through the VEIL frequency bandpass filter 250, signal rectifier 260, and integrator 270 pursuant to the repeated requests of microcontroller 280. Microcontroller 280, upon receiving data upon each segment request, provides system output 290.

In view of the foregoing description, it will be seen that the several objects of the inventive subject matter are achieved and other advantages are attained. The embodiments and examples were chosen and described in order to best explain the principles of the inventive subject matter and the practical applications to thereby enable others skilled in the art to best utilize the inventive subject matter in various embodiments and with various modifications as are suited to the particular use contemplated.

As various modifications could be made in the constructions and methods herein described and illustrated without departing from the scope of the inventive subject matter, it is intended that all matter contained in the foregoing description or shown in the accompanying drawings shall be interpreted as illustrative rather than limiting.

The breadth and scope of the inventive subject matter should not be limited by any of the above-described exemplary embodiments, but should be defined only in accordance with claims of the application and their equivalents.

The present system and hand-held devices useful in the system may be for these purposes distributed by various business entities, which may include not only the sponsor of a program, event, or other sponsored transmission, but may also include various businesses, services and organizations having commercial relationships with the sponsor. Viewer's use of the new devices of the invention accordingly provide commercially advantageous results relating to television advertising, promotions and other sponsored transmissions, wherein new system and devices and their use is effective to:

Attract viewer attention to advertising, promotions and other sponsored transmissions, Effectively increase awareness and retention of message and product, Induce viewers to respond and take action after viewing to sponsored transmissions, Differentiate a sponsor's product or service from those of competitors, Stimulate viewers to desire to watch advertising, promotions and transmissions, Provide a novel, cost-effective, brand efficient, and enjoyable medium for enhancing advertising, promotions and other transmissions, Cause advertising, promotions and transmissions to take on special event significance, Build customer traffic in places of business or points of sale associated with sponsors of advertising, promotions and other transmissions, Increase consumer loyalty to sponsors of advertising, promotions and transmissions, Increase viewer involvement in sponsored advertising, promotions and transmissions, Cause viewer retention of sponsor identity and advertising or promotional content, Enhance sales volume resulting from the sponsorship of advertising, promotions and transmissions, Provide lasting value to sponsored advertising, promotions and transmissions, Provide enhanced viewer/spectator involvement in sporting and racing events, Afford viewers of television programming an opportunity to interact meaningfully with programming content and with advertising, promotions and transmissions, Enhance viewer good-will relative to advertising, promotions and events, and/or Cause development of still other opportunities for interactive use of the devices.

FIG. 21 illustrates another example of the inventive subject matter. Composite signals projected by the display device 10 (shown in FIG. 1) to be received by an interactive hand-held device 2100. The composite signals may include a video signal, an audio signal, and/or auxiliary data. The video signal may have the auxiliary data encoded (e.g., added via modulation or another technique) in the video signal so that the device 2100 can optically receive the video signal and decode (e.g., demodulate) the auxiliary data from the video signal. Optionally, the audio signal may have the auxiliary data encoded (e.g., added via modulation or another technique) in the audio signal so that the device 2100 can audibly receive the audio signal and decode (e.g., demodulate) the auxiliary data from the audio signal. Optionally, the video signal and/or the audio signal may not have the auxiliary data encoded in the video signal or audio signal, but the device 2100 may detect the video signal and/or the audio signal (or a portion thereof) and, responsive to this detection, the device 2100 may obtain the auxiliary data, such as by downloading the auxiliary data from a remote location via one or more wired and/or wireless connections with the remote location (e.g., a server that is not included in the device 2100).

The device 2100 may be similar or identical to the hand-held device 12, and may be in the form of any type of hand manipulable device such as a smart card, cell phone, PDA, or other palm like device. Hand-held device 2100 may include one or more embodiments of the circuitry shown and/or described herein. Hand-held device 2100 may be held in the palm or between the fingers of a user in the generally vicinity of display device 10, typically within the same room and, when necessary, oriented so that when a front surface 2116 of the device 2100 faces display device 10, a lens 2136 (e.g., a camera) of the device 2100 can optically receive light from a visual representation of the video signal from display device 10. The device 2100 includes an audio pick-up device 2104, such as a microphone, that can audibly receive audio signals from the device 10.

Hand-held device 2100 is depicted in FIG. 21 as a mobile phone and shown in a manner in which it may be held and used. Hand-held device 2100 may include a PDA-sized housing 2114 that encloses various circuits and circuit components ("circuitry") of the device. Housing 2114 may be of any hand-held shape desired that is functional and hand manipulable, examples of which include a PDA, cell phone, PCMCIA card, snapshot-type camera, replica sports helmet, replica baseball bat or football, or scaled racing car.

Hand-held device 2100 is illustrated to have the pick-up device 2104, the RF antennae 2168, and/or the lens 2136 so that device 2100 may receive auxiliary data by optical, audio, and/or electrical (e.g., wireless) techniques. When hand-held device 2100 includes such reception means, it may be used with various promotional opportunities in various locations. Thus, with one example of the present invention, a user may receive auxiliary data on hand-held device 2100 at a game inside a stadium or arena electrically via RF antennae 2168, and may also receive auxiliary data while watching a game at home optically by positioning front surface 2116 toward display device 10. Users may thus participate in promotional in multiple locations using the same hand-held device 2100. Optionally, the hand-held device 2100 can audibly receive the auxiliary data encoded in audio of the composite signal and/or the hand-held device 2100 can wirelessly receive the auxiliary data via the antennae 2168 in response to receiving the audio signal (or a portion thereof).

For example, in one aspect, the auxiliary data may be added to an existing audio signal by modulating the audio signal with the auxiliary data. The auxiliary data may be added in that the audio signal may be created or otherwise generated for a program being displayed on the device 10 (e.g., a television show, movie, sporting event, etc.) and the auxiliary data is added to this audio signal without being a part of the original audio or part of the sounds of the show, movie, sporting event, etc. Upon receiving the audio signal with the auxiliary data encoded therein or thereon, the device 2100 can demodulate the auxiliary data from the audio signal. The auxiliary data that is encoded into the audio and/or video signal may be referred to as a watermark. The watermark is data added to the audio signal, video signal, or a composite signal of the audio and video signals. The watermark can be used to trigger one or more devices other than the device 10 (e.g., mobile phones, tablet computers, other computers, etc.) to present information to a user, to obtain additional data, or the like, as described herein.

In another example, the auxiliary data may not be included in the video signal or audio signal presented by the device 10, but may be obtained by the device 2100 in response to the device 2100 optically and/or audibly detecting the video signal, the audio signal, or a portion thereof. The device 2100 may detect all or part of the video signal and/or audio signal and compare this detected signal (video and/or audio) to designated video fingerprints and/or audio fingerprints. A video fingerprint includes a video or portion thereof that is unique relative to other videos. For example, a video fingerprint may include a short video (e.g., a few seconds long) that is different from other videos or other portions of the same video. The device 2100 can compare the video that is detected from the device 10 and compare the detected video to one or more video fingerprints (stored locally in a memory of the device 2100 and/or in a remote memory, such as a server). If the detected video matches the video fingerprint, then the device 2100 may obtain the auxiliary data from a remote location. As another example, an audio fingerprint may include an audio clip that is different from other audio signals or other portions of the same audio signal. The device 2100 can compare the audio that is detected from the device 10 and compare the detected audio to one or more audio fingerprints (stored locally in a memory of the device 2100 and/or in a remote memory, such as a server). If the detected audio matches the audio fingerprint, then the device 2100 may obtain the auxiliary data from a remote location. In these situations, the device 2100 obtains the auxiliary data in response to detecting the video and/or audio signal that matches the video and/or audio fingerprint.

A typical manner in which hand-held device 2100 is used to receive auxiliary data is as follows: A user watches a television presentation or listens to an audio presentation such as a commercial, television program, movie, or other program. The video signal and/or audio signal is detected and received by the lens 2136 and/or pick-up device 2104. The video signal can include a video signal modulated with auxiliary data, the audio signal can include an audio signal modulated with the auxiliary data, and/or the video and/or audio signal may not be modulated with the auxiliary data. The device 2100 may then demodulate the auxiliary data from the received signal and/or obtain the auxiliary data in response to detecting an audio and/or video fingerprint. The auxiliary data may then be used in accordance with one or more examples described herein. Optionally, the auxiliary data may be used to provide a user with an enhanced interactive experience. For example, the auxiliary data may be displayed on the device 2100 to the user and may provide additional information about the program being shown on the device 10, the sporting event in the vicinity of the user or shown on the device 10, or the like. The auxiliary data may provide or be used to provide a game on the device 2100 that is played along with the video signal and/or audio signal being presented via the device 10. A display 2144 of the device 2100 may be similar to LCD 44 or may be another type of display device, and can present the auxiliary data as described herein.

The device 2100 may include one or more of the microprocessors described above for performing the operations described herein. The microprocessors may receive signals from the device 10, such as a television, where the signals include an audio signal. The microprocessors may receive such a signal via the pick-up device 2104. The antenna 2168 can wirelessly receive or otherwise obtain data in response to receiving the signal with the audio signal from the television. For example, the antenna 2168 can be similar to the antenna 68 and can wirelessly communicate with a remote location (e.g., one or more servers) via the Internet and/or another network to obtain the data. The display 2144 can be similar to the LCD 44 or other display device, and can visually display a user input screen based at least in part on the data that is wirelessly received. For example, the microprocessors can direct the display 2144 to show a game, images, videos (which may be formed from two or more images), or the like, in conjunction with a program being shown on the device 10.

The microprocessors can provide a game that the user can play on the device 2100, with the game being interactive with the show, program, sporting event, etc., being displayed on the device 10. A user can watch a television show and the device 2100 can detect audio (and/or video) from the television show, with the audio and/or video including the auxiliary data and/or the device 2100 obtaining the auxiliary data responsive to detecting the audio and/or video of the television show. The device 2100 can then use the auxiliary data to present a game to the user, with the game including trivia questions, challenges, or the like, that are in the television show, based on events in the television show, or otherwise related to the television show. Optionally, the device 2100 can present additional information about characters and/or actors in the television show, trivia about the television show, statistics for athletes shown in the television show (e.g., a sporting event), promotional information about sponsors of the television show, etc.

The device 2100 can receive user input from the user in response to the display shown to the user on the device 2100 and can process this user input. For example, the user may select answers to the game being shown on the device 2100, the user may move a video game character in a game being shown on the device 2100, the user may type and/or select text or images shown on the device 2100, or the like, as user input. The device 2100 can then examine the user input in connection with the game to assist the user in playing the game. For example, the device 2100 can determine if the user input represents a correct or incorrect answer to a question in the game, if the user input moves a character in one or more designated ways (to advance in the game), if the user input requests additional or different information than the information being presented to the user. The device 2100 can then advance play of the game and/or otherwise change the information being shown to the user on the device 2100 based on the user input that is received. For example, responsive to receiving user input, the device 2100 can communicate with one or more remote locations (e.g., servers) to obtain additional data. This additional data may then be used to change the display shown on the device 2100, such as by showing the results of the game, additional game play, different information requested by the user input, etc.

The information presented by the device 2100 in connection with the information being shown on the display 10 can provide a second screen experience to a user of the device 2100. This experience may provide the user with additional video and/or audio that is not concurrently being shown on the display 10, but that may be related to the program being shown on the display 10. For example, the additional video and/or audio may be additional or deleted scenes from a movie or show, highlights of other sporting events, or the like. As another example, the device 2100 may provide web browsing software in response to receiving the auxiliary data. For example, the auxiliary data may include a link to a web page that is automatically opened by web browsing software operating on the device 2100.

In view of the foregoing description of the inventive subject matter and practical embodiments it will be seen that the several objects of the inventive subject matter are achieved and other advantages are attained. The embodiments and examples were chosen and described in order to best explain the principles of the inventive subject matter and its practical application to thereby enable others skilled in the art to best utilize the inventive subject matter in various embodiments and with various modifications as are suited to the particular use contemplated.

As various modifications could be made in the constructions and methods herein described and illustrated without departing from the scope of the inventive subject matter, it is intended that all matter contained in the foregoing description or shown in the accompanying drawings shall be interpreted as illustrative rather than limiting.

The breadth and scope of the inventive subject matter should not be limited by any of the above-described embodiments, but should be defined only in accordance with the following claims and their equivalents.

The invention claimed is:

1. A device comprising:
one or more computer microprocessors configured to receive a first signal from a television, the first signal including an audio signal;
one or more antenna configured to wirelessly receive data in response to receiving the first signal with the audio signal from the television; and
a display configured to visually display a user input screen based at least in part on the data that is wirelessly received, wherein at least one of the one or more computer microprocessors is configured to receive user input from a user in response to the visual display of the user input screen and to process the user input, wherein the display is configured to present video that is based on the audio signal and that is different from a program concurrently presented on the television.

2. The device of claim 1, wherein the data that is wirelessly received is encoded in the audio signal received from the television, and the one or more computer microprocessors are configured to decode the data from the audio signal.

3. The device of claim 1, wherein the one or more computer microprocessors, the one or more antenna, and the display are included in a hand held electronic telephone device.

4. The device of claim 1, wherein the one or more computer microprocessors are configured to receive the data as encoded data that is encoded within at least one of the first signal or a subsequent encoded signal that is received from the television.

5. The device of claim 1, wherein at least one of the one or more computer microprocessors also is configured to operate the device as a telephone.

6. The device of claim 1, wherein the one or more antenna also are configured to transmit a user input notification over a network to a server, the user input notification based on processing of the user input, the one or more antenna configured to receive a server response from the server in response to transmission of the user input notification, wherein the display is configured to visually display a user screen based at least in part on receipt of the server response.

7. The device of claim 1, wherein the display is configured to present video that is different from video presented on the television.

8. The device of claim 1, wherein the one or more computer microprocessors are configured to provide the user with a game that is played based at least in part on the user input.

9. The device of claim 1, wherein the one or more computer microprocessors are configured to provide web browsing software in response to wirelessly receiving the data.

10. A hand held device comprising:
a display configured to present user-interactive images;
a microphone configured to audibly detect an audio signal encoded with auxiliary data from a program being presented on an external display device; and
one or more microprocessors configured to decode the auxiliary data from the audio signal and to generate the user-interactive images for presentation on the display using the auxiliary data, wherein the display is configured to present video that is based on the auxiliary data and that is different from the program presented on the external display device.

11. The device of claim 10, wherein the one or more microprocessors also are configured to operate the device as a mobile telephone and the external display device is a television.

12. The device of claim 10, further comprising one or more antenna configured to wirelessly obtain additional data responsive to the one or more microprocessors decoding the auxiliary data.

13. The device of claim 12, wherein the one or more antenna also are configured to transmit a user input notification over a network to a server, the user input notification based on processing of the user input, the one or more antenna configured to receive a server response from the server in response to transmission of the user input notification, wherein the display is configured to visually display a user screen based at least in part on receipt of the server response.

14. The device of claim 10, wherein the one or more computer microprocessors are configured to provide the user with a game via the display using the auxiliary data.

15. A hand held device comprising:
a display configured to present user-interactive images;
a microphone configured to audibly detect an audio signal from a program being presented on an external display device; and
one or more microprocessors configured to obtain auxiliary data from a remote location responsive to detecting the audio signal and to generate the user-interactive images for presentation on the display using the auxiliary data, wherein the display is configured to present video that is based on the auxiliary data and that is different from the program presented on the external display device.

16. The device of claim 15, wherein the one or more microprocessors also are configured to operate the device as a mobile telephone and the external display device is a television.

17. The device of claim 15, further comprising one or more antenna configured to wirelessly obtain the auxiliary data responsive to the audio signal being detected.

18. The device of claim 15, wherein the one or more computer microprocessors are configured to provide the user with a game via the display using the auxiliary data.

* * * * *